(12) United States Patent
Amano et al.

(10) Patent No.: US 6,736,168 B2
(45) Date of Patent: May 18, 2004

(54) FIBER REINFORCED PLASTIC PIPE AND FILAMENT WINDING APPARATUS

(75) Inventors: Masaaki Amano, Kariya (JP); Yoshiharu Yasui, Kariya (JP); Yasuki Miyashita, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 79 days.

(21) Appl. No.: 10/106,686

(22) Filed: Mar. 25, 2002

(65) Prior Publication Data

US 2002/0139430 A1 Oct. 3, 2002

(30) Foreign Application Priority Data

Mar. 27, 2001 (JP) ........................................ 2001-090260

(51) Int. Cl.$^7$ ................................................ F16L 11/00
(52) U.S. Cl. ...................... 138/129; 138/130; 138/172; 138/153
(58) Field of Search .................... 138/153, 172, 138/DIG. 7, 177, 178, 129, 123, 124, 130; 464/181, 183

(56) References Cited

U.S. PATENT DOCUMENTS

| 4,248,062 A | 2/1981 | McLain et al. | ............. 464/181 |
|---|---|---|---|
| 4,664,644 A | 5/1987 | Kumata et al. | ............. 464/180 |
| 4,863,416 A | 9/1989 | Gupta | ......................... 464/181 |
| 6,350,204 B1 | 2/2002 | Yasui et al. | .................. 464/181 |

FOREIGN PATENT DOCUMENTS

| DE | 30 10 018 A1 | 9/1981 | ........... B29D/23/12 |
|---|---|---|---|
| DE | 37 42 255 C1 | 5/1989 | ........... B29C/53/66 |
| DE | 41 22 785 C2 | 1/1993 | ........... B29C/67/12 |
| GB | 2 213 461 A | 8/1989 | ........... B65H/81/00 |
| JP | 56-145072 | 11/1981 | ........... B65H/54/64 |
| JP | 06-254974 | 9/1994 | ........... B29C/67/14 |
| JP | 08-276504 | 10/1996 | ........... B29C/70/16 |
| JP | 11-286056 | 10/1999 | ........... B29C/70/16 |
| JP | 2000-108213 | 4/2000 | ........... B29C/70/16 |

*Primary Examiner*—Patrick Brinson
(74) *Attorney, Agent, or Firm*—Morgan & Finnegan, LLP

(57) ABSTRACT

A FRP pipe comprising a helix winding layer formed by cylindrically winding reinforced fibers, wherein the helix winding layer has two ends and an axis and the reinforced fibers forming the helix winding layers are wound at an angle relative to the axis and hoop winding layers formed at each end of the helix winding layer by winding reinforced fibers at each end wherein the hoop layer are formed from the same continuous reinforced fibers, and the continuous reinforced fibers forming the hoop winding layers extend between the ends at an angle that is the same as the angle of the reinforced fibers forming the helix winding layer.

3 Claims, 22 Drawing Sheets

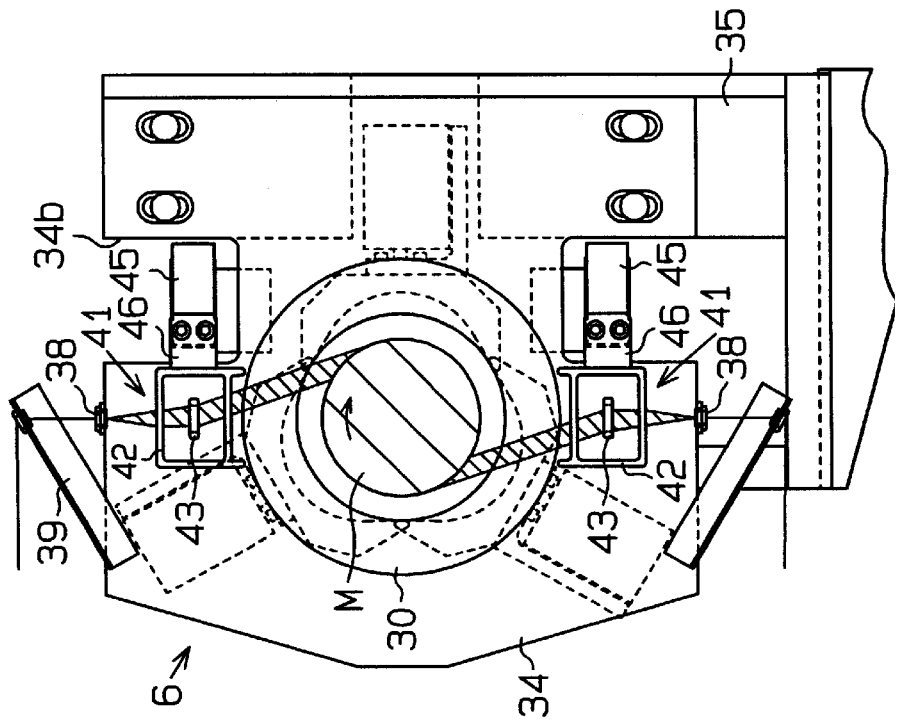
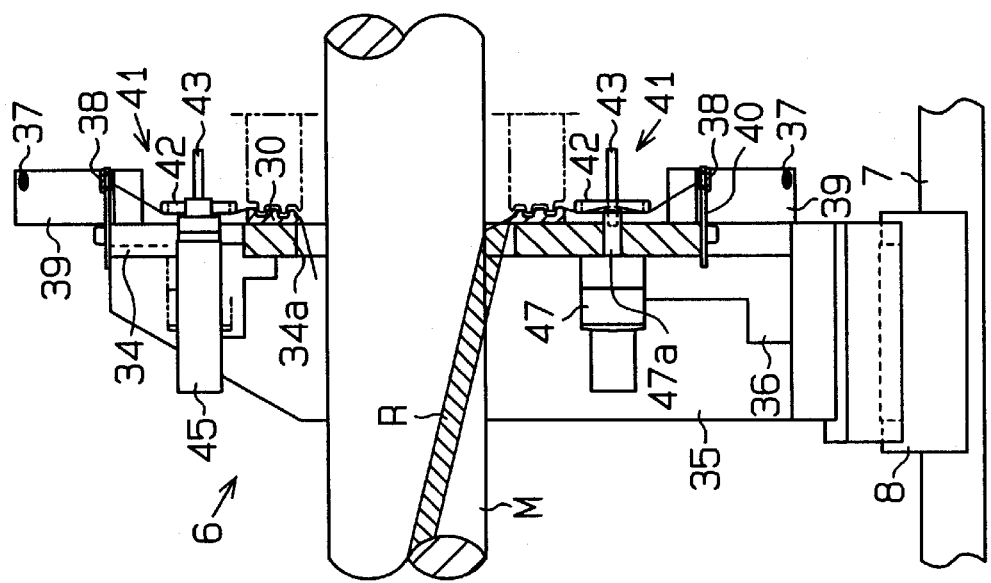
Fig.12(a)
Fig.12(b)

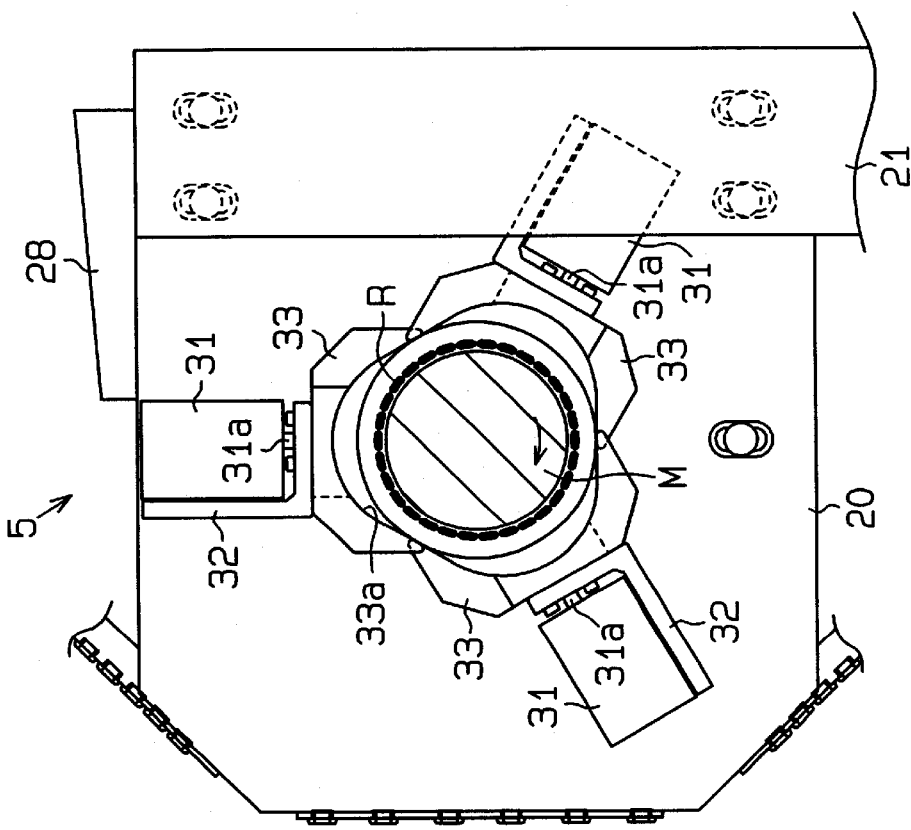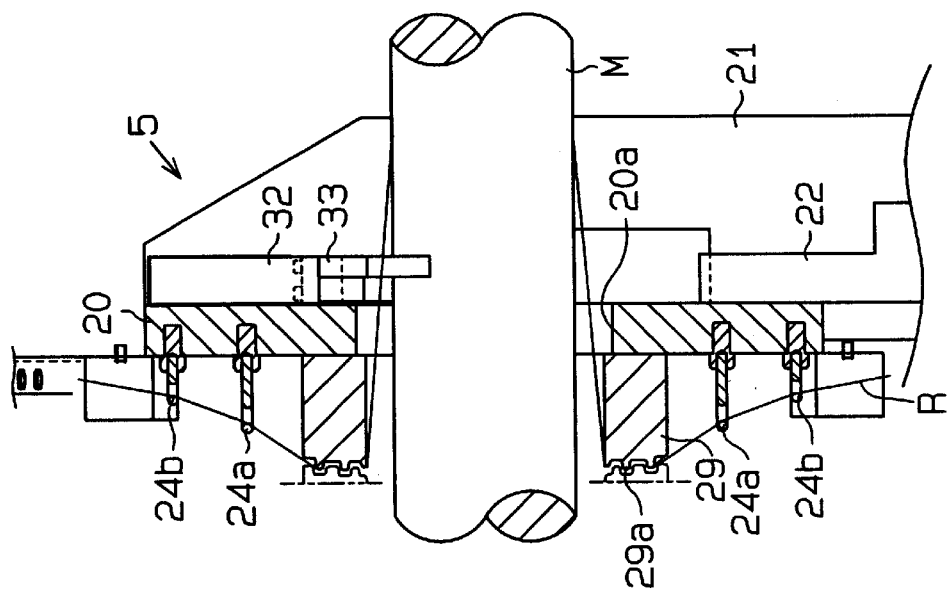

FIBER REINFORCED PLASTIC PIPE AND FILAMENT WINDING APPARATUS

BACKGROUND OF THE INVENTION

The present invention relates to fiber reinforced plastic pipes (FRP pipes) and filament winding apparatuses, and, more particularly, to FRP pipes that have a helix winding layer and a hoop winding layer and to filament winding apparatuses that manufacture the FRP pipes.

A filament winding process is used to efficiently fabricate an FRP pipe or container. Generally, the process uses a filament winding apparatus that has a chuck mechanism and a fiber feeding mechanism. The chuck mechanism holds shafts that project from opposite ends of a mandrel and rotates the mandrel at a predetermined speed. The fiber feeding mechanism feeds a fiber strand, which is impregnated with resin, to the mandrel and winds the fiber strand around the mandrel body. To increase the productivity of the process and improve the quality of the product, it is preferred that the fiber strand be wound around the mandrel body in a spread state.

Japanese Laid-Open Patent Publication No. 11-286056 describes an apparatus that spreads a fiber strand and winds the spread fiber strand around a mandrel. The fiber strand is spread regardless of the angle at which the fiber strand is wound to the mandrel. Referring to FIG. 23, the apparatus includes a mandrel 91, a resin impregnating tank 92, and a guide roller 94. The mandrel 91 rotates and moves reciprocally in the axial direction. The guide roller 94, which moves relative to the resin impregnating tank 92, guides a fiber strand 93 from the resin impregnating tank 92 to the mandrel 91. The resin impregnating tank 92 and the guide roller 94 are arranged on a table 96, which is supported by a support shaft 95. The table 96 and the guide roller 94 move in accordance with the angle at which the fiber strand 93 is wound to the mandrel 91 so that the fiber strand 93, which is guided by the guide roller 94 from the resin impregnating tank 92 to the mandrel 91, is straightened.

Japanese Laid-Open Patent Publication No. 8-276504 describes an apparatus that has a feed eye 97, as shown in FIG. 24. The feed eye 97 includes a plurality of slits 97a to simultaneously wind a plurality of fiber strands 93 around a mandrel 91. The feed eye 97 is secured to a base plate 98. The base plate 98 rotates about the fiber strands 93 fed to the slits 97a. The base plate 98 also pivots about a line perpendicular to a plane that includes the fiber strands 93.

Japanese Laid-Open Patent Publication No. 6-254974 describes an apparatus having a pad. The pad has an arcuate surface for rubbing fiber strand, which is impregnated with resin, when the fiber strand is wound around the mandrel. This defoams the resin and removes excessive resin from the fiber strand.

The apparatus of Japanese Laid-Open Patent Publication No. 11-286056 cannot simultaneously wind multiple fiber strands 93 around the mandrel 91. In contrast, the apparatus of Japanese Laid-Open Patent Publication No. 8-276504 winds simultaneously helically winds multiple fiber strands 93 around the mandrel 91 to form a helix winding layer. However, when the base plate 98 and its drive mechanism of the base plate 98 reaches one end of the mandrel 91 where the winding direction of the fiber strands R is reversed, the base plate 98 and a drive mechanism overhang from the mandrel 91. This enlarges the space required to enable the reciprocating movement of the base plate 98.

Further, to fabricate an FRP pipe having the desired property, a hoop winding layer, which is formed by winding a fiber strand around a mandrel in a direction substantially perpendicular to the axis of the mandrel, may have to be formed on a helix winding layer. Alternatively, a helix winding layer may have to be formed on a hoop winding layer. However, the aforementioned apparatuses cannot switch between the two types of windings. In addition, a pair of hoop winding layers may have to be formed on a helix winding layer at opposite ends of the FRP pipe. If such a case, to increase productivity, it is preferred that each fiber strand not be cut when completing the formation of one hoop winding layer at one end of the pipe and shifting to the other end of the pipe to form the other hoop winding layer. To form two hoop winding layers at opposite ends of an FRP pipe, a fiber strand continuously extending from one hoop winding layer is helically wound around the underlying helix winding layer as a crossing thread until it reaches the other end of the pipe where the other hoop winding layer is formed. Further, in some cases, after the hoop winding layers are formed, another helix winding layer may be formed on the hoop winding layers.

Also, in the apparatus of Japanese Laid-Open Patent Publication No. 6-254974, only part of the mandrel is faced toward the pad. In other words, the pad does not cover the entire circumference of the mandrel. Thus, the pad cannot sufficiently remove resin from the fiber strand.

In addition, an organic fiber that is not impregnated with resin, such as a polyester fiber, may be wound around an outermost layer of the resin-impregnated fiber strands to fabricate an FRP pipe with a relatively high fiber volume content (Vf). This removes excessive resin from the fiber strands. However, in such case, the form of the crossing thread may appear through the organic fiber depending on the winding angle of the crossing thread. This is not desirable with regard to the appearance of the FRP pipe.

SUMMARY OF THE INVENTION

Accordingly, it is a first objective of the present invention to provide an FRP pipe that improves productivity even if the FRP pipe includes a helix winding layer and a pair of hoop winding layers that are formed at opposite ends of the pipe. It is a second objective of the present invention to provide an optimal filament winding apparatus for fabricating an FRP pipe. It is a third objective of the present invention to provide a filament winding apparatus that efficiently removes excessive resin from a fiber strand.

To achieve the above object, the present invention provides an FRP pipe including a helix winding layer formed by cylindrically winding reinforced fibers. The helix winding layer has two ends and an axis, and the reinforced fibers forming the helix winding layer are wound at an angle relative to the axis. Hoop winding layers are formed at each end of the helix winding layer by winding reinforced fibers at the ends. The hoop winding layers are formed from the same continuous reinforced fibers.

A further perspective of the present invention is a filament winding apparatus for winding fiber strands to a cylindrical wound subject while rotating the wound subject. The apparatus includes a winding unit moved reciprocally along an axial direction of the wound subject. The winding unit winds fiber strands, which are impregnated with resin, around the wound subject. The winding unit includes a helix winding head for simultaneously winding fiber strands around the wound subject, a hoop winding head for simultaneously winding a fiber strand around the wound subject, a helix fiber spreading portion for spreading the fiber strands wound around the wound subject by the helix winding head, and a hoop fiber spreading portion for spreading the fiber strand wound around the wound subject by the hoop winding head.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objectives and advantages thereof, may best be understood by reference to the following description of the presently preferred embodiments together with the accompanying drawings in which:

FIG. 12(a) is a schematic front view showing a hoop fiber spreading portion when spreading a fiber strand for helix winding;

FIG. 12(b) is a schematic right view showing the state of FIG. 12(a)

FIG. 14(a) is a schematic cross-sectional view showing the helix winding head in a state in which rubbing members are held at standby positions;

FIG. 14(b) is a schematic right view showing the state of FIG. 14(a);

DETAILED DESCRIPTION OF THE PREFERRED EMBODIMENTS

Figure 1:
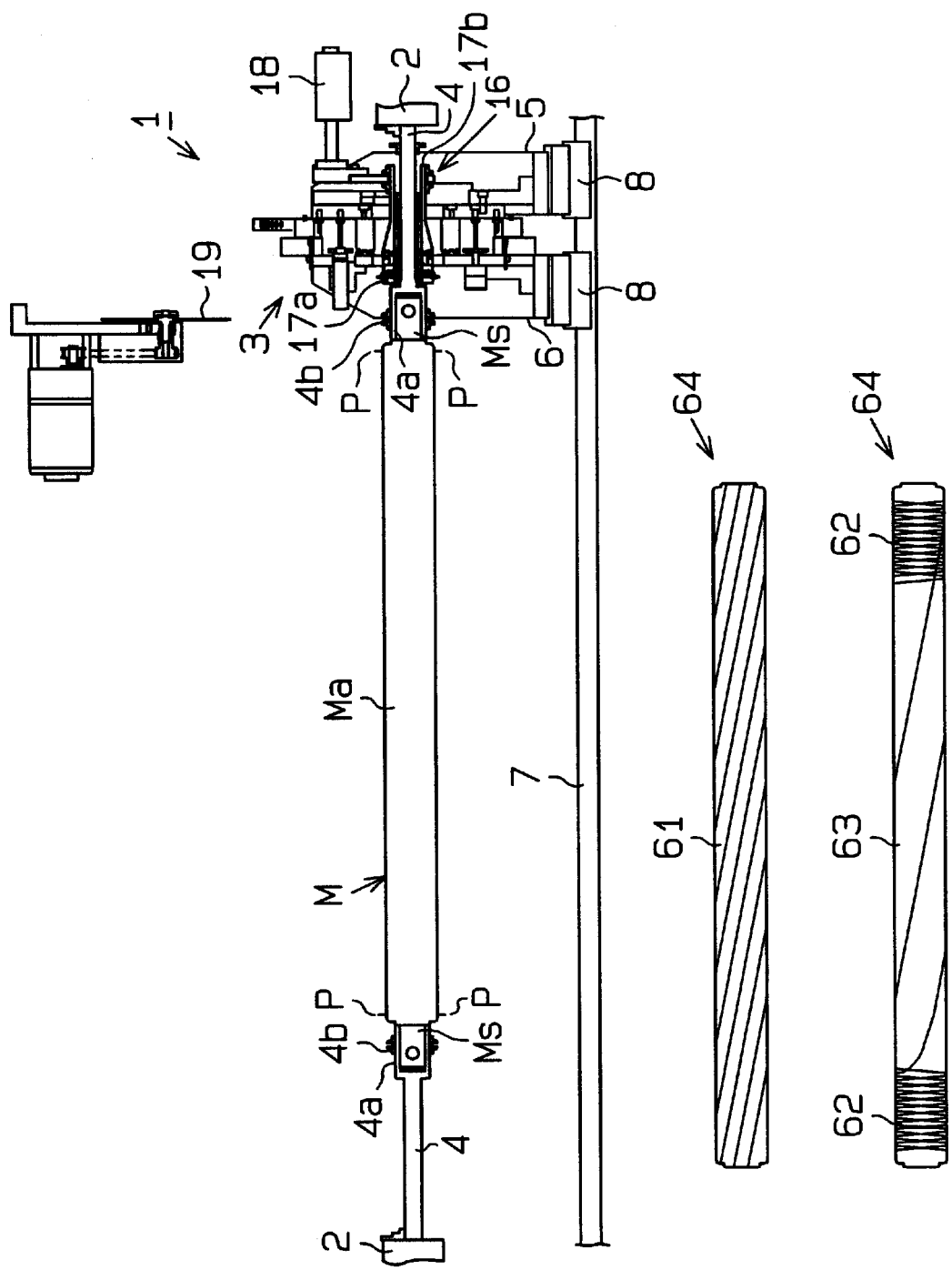
FIG. 1(a) is a schematic front view showing a filament winding apparatus according to a first embodiment of the present invention.
FIG. 1(b) is a schematic view showing a helix winding layer of an FRP pipe.
FIG. 1(c) is a schematic view showing hoop winding layers of the FRP pipe.

A filament winding apparatus 1 according to a first embodiment of the present invention will now be described with reference to FIGS. 1 to 19. The filament winding apparatus 1 fabricates an FRP pipe that has a pair of hoop winding layers at opposite ends of the pipe. The hoop winding layers are formed from the same continuous fiber strands.

FIG. 1(a) is a front view schematically showing the filament winding apparatus 1, FIG. 1(b) is a front view schematically showing a helix winding layer of the FRP pipe fabricated by the filament winding apparatus 1, and FIG. 1(c) is a front view schematically showing the hoop winding layers and a crossing thread.

Referring to FIG. 1(a), the apparatus 1 includes a pair of chucks 2 and a winding unit 3. The winding unit 3 reciprocally moves in the axial direction of a wound subject, or mandrel M, which is supported by the chucks 2. A connecting shaft Ms projects from each end of a mandrel body Ma. Each of the chucks 2 clamps a rotary shaft 4. Each connecting shaft Ms is connected to an associated one of the rotary shafts 4. A plurality of equally spaced detachable pins P is circumferentially arranged at each end of the mandrel body Ma. The pins P function as a restricting portion. FIG. 1(a) shows only two of the pins P on each end of the body Ma.

The winding unit 3 includes a helix winding head 5 and a hoop winding head 6. The helix winding head 5 and the hoop winding head 6 move integrally with each other or independently from each other. A rail 7 extends along a base frame (not shown) in the axial direction of the mandrel M. Two sliders 8 slide along the rail 7. The helix winding head 5 and the hoop winding head 6 are each fixed to one of the sliders 8.

Figure 2:
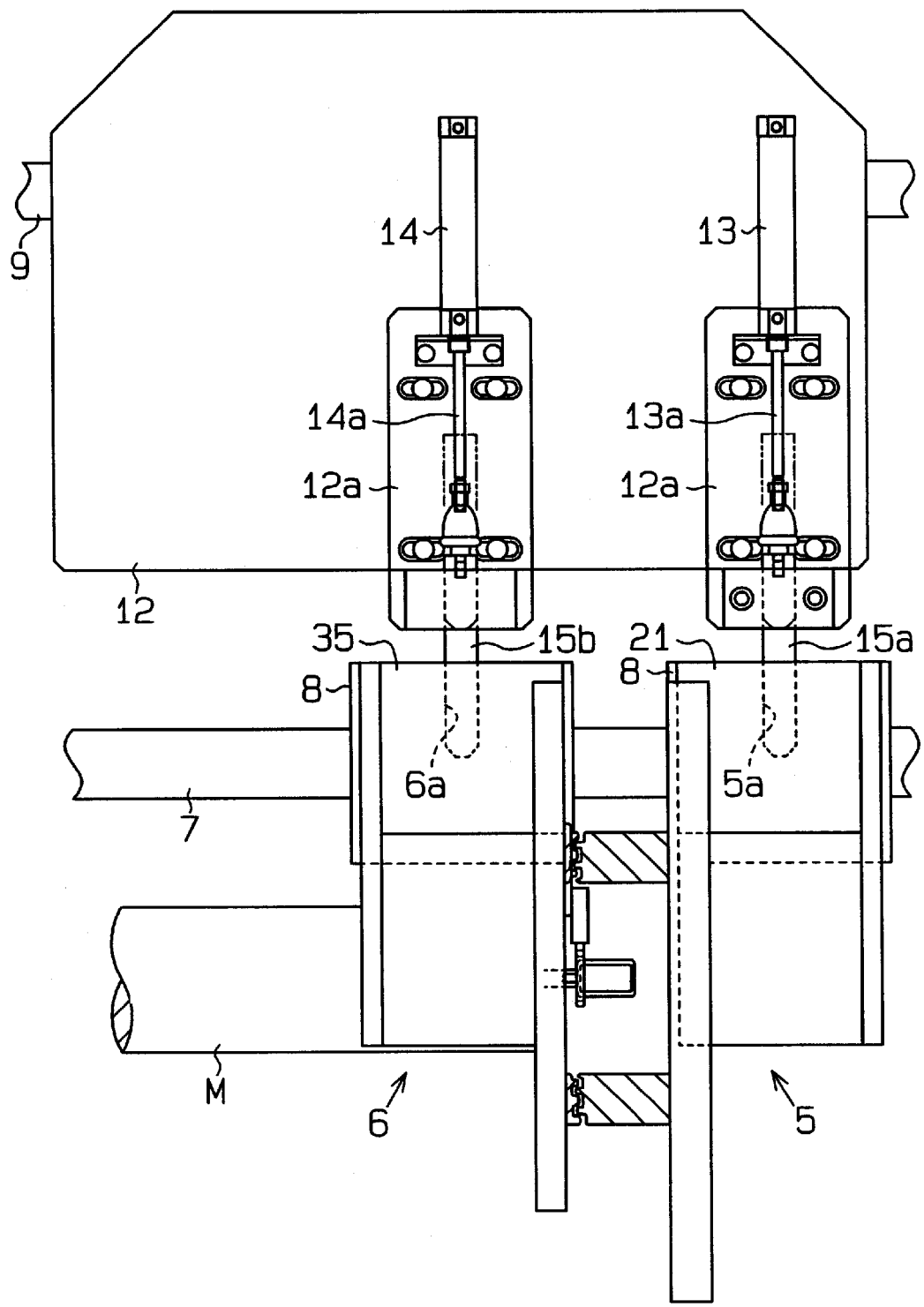
FIG. 2 is a schematic plan view showing a winding unit and a drive mechanism.
Figure 3:
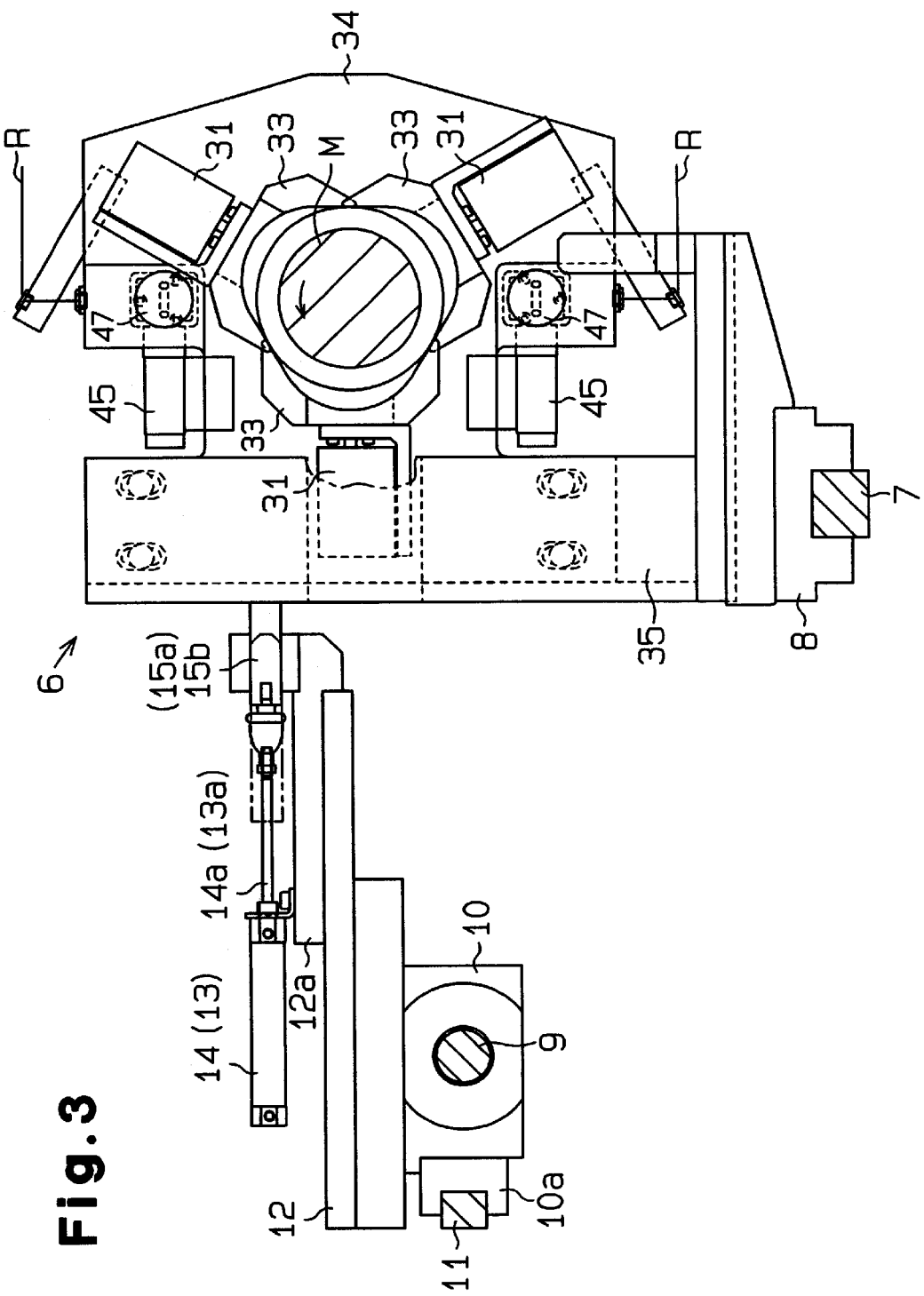
FIG. 3 is a schematic side view showing the winding unit and the drive mechanism.

FIG. 2 is a plan view schematically illustrating the arrangement of the winding unit 3 and a drive unit that drives the winding unit 3. FIG. 3 is a schematic side view of FIG. 2.

Referring to FIGS. 2 and 3, a pair of drive mechanisms for driving the helix winding head 5 and the hoop winding head 6 are located on one side of the rail 7. A ball screw 9, which is supported by the base frame, extends parallel to the rail 7. A servomotor (not shown) rotates the ball screw 9. A guide member 10a (shown only in FIG. 3) is attached to a ball nut 10 (shown only in FIG. 3). The guide member 10a is engaged with a guide rail 11 (shown only in FIG. 3), which extends parallel to the ball screw 9. The guide member 10a slides along the guide rail 11. A drive plate 12 is fixed to the ball nut 10 and held horizontally. The drive plate 12 moves along the rail 7 at a speed corresponding to the rotating speed of the ball screw 9.

Two cylinders (connecting members) 13, 14, which are each fixed to the drive plate 12 by means of a support block 12a, extends perpendicular to the rail 7. The first cylinder 13 includes a piston rod 13a to which a connecting rod 15a is coaxially connected. The second cylinder 14 includes a piston rod 14a to which a connecting rod 15b is coaxially connected. Two engaging holes 5a, 6a (shown only in FIG. 2) are respectively formed in the helix winding head 5 and the hoop winding head 6. When the piston rod 13a is extended, the first engaging hole 5a receives the connecting rod 15a. Likewise, when the piston rod 14a is extended, the second engaging hole 6a receives the connecting rod 15b. When the ball screw 9 rotates with the connecting rods 15a, 15b received in the holes 5a, 6a, the helix winding head 5 and the hoop winding head 6 move along the rail 7 together with the drive plate 12. When the ball screw 9 rotates in a forward direction, the helix winding head 5 and the hoop winding head 6 move to the left, as viewed in FIGS. 1 and 2. When the ball screw 9 rotates in a reverse direction, the helix winding head 5 and the hoop winding head 6 move to the right.

Referring to FIG. 1(a), an end portion processing device 16 is located at one end of the mandrel M. The end portion processing device 16 temporarily holds a winding initiating end of a fiber strand wound around the mandrel M to prevent the winding initiating end from interfering with the winding. The end portion processing device 16 also holds a winding terminating end of the fiber strand to prevent the fiber strand from loosening until the wound fiber strand hardens. Further, the end portion processing device 16 cuts the fiber strand to a predetermined length. The end portion processing device 16 includes a fixed holder 17a and a movable holder 17b. One of the rotary shafts 4 supports a cylindrical support (not shown). The cylindrical support is relatively rotatable to the rotary shaft 4. The fixed holder 17a is fixed to the cylindrical support. The movable holder 17b slides along the cylindrical support. An air cylinder 18 moves the movable holder 17b between a hold position (FIG. 1(a)), at which the movable holder 17b cooperates with the fixed holder 17a to hold a fiber stand, and a release position (FIG. 17(b)), which is separated from the hold position. A plurality of pins projects radially from the outer side of the fixed holder 17a.

Referring to FIG. 1(a), the rotary shafts 4 each include a large diameter portion 4a. A cutting assisting member 4b, which is secured to the large diameter portion 4a of each rotary shaft 4, includes a plurality of radial projections. A rotary cutter 19 is located above one of the cutting assisting members 4b and moves vertically between a standby position (FIG. 1(a)) and a cutting position (FIG. 17(a)). To facilitate understanding, hatching lines are not used to indicate that the portions of the fixed holder 17a and the movable holder 17b shown in the drawings are cross-sections.

Figure 4:
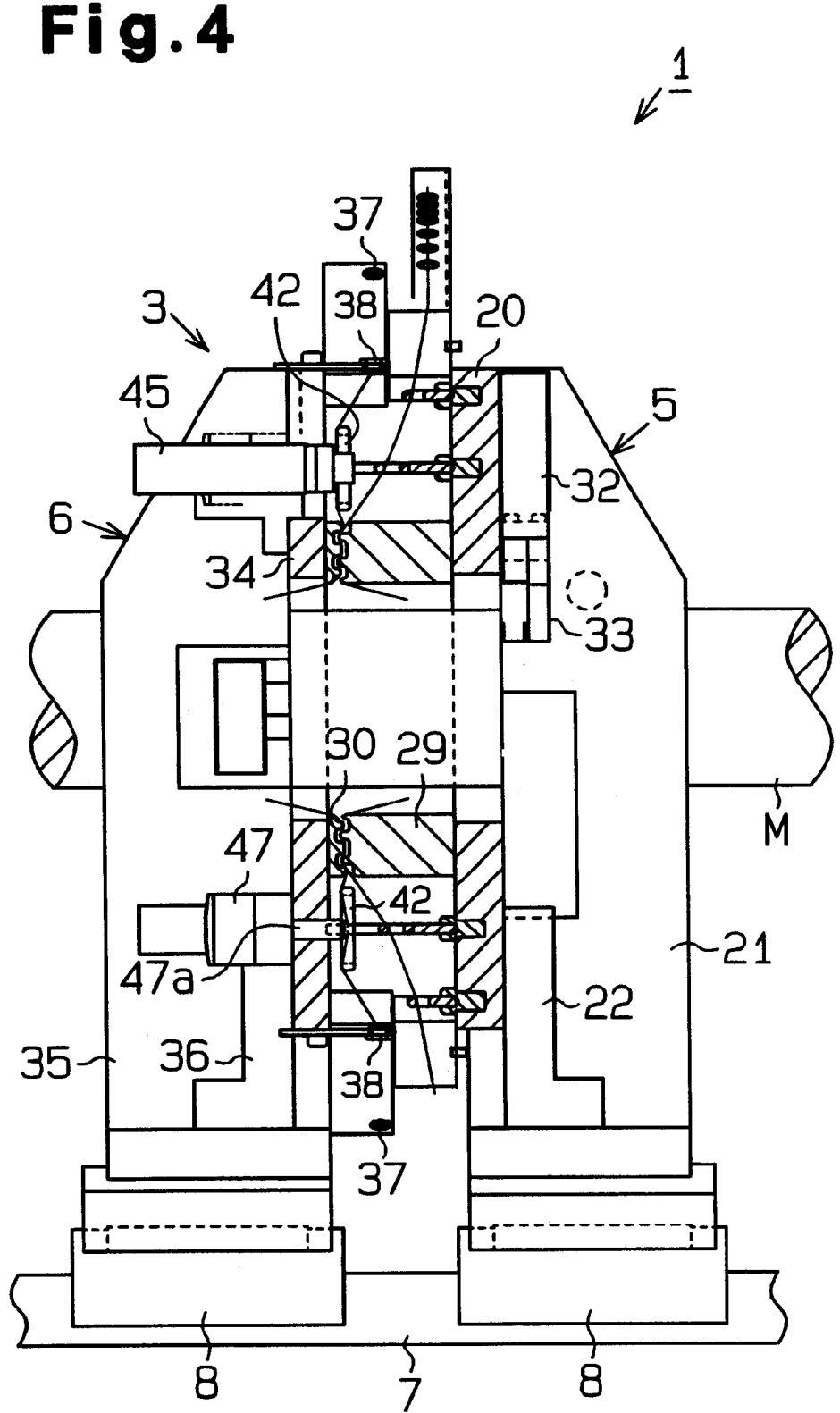
FIG. 4 is a partial schematic front view showing the winding unit in a state in which its two heads are moved integrally.
Figure 5A:
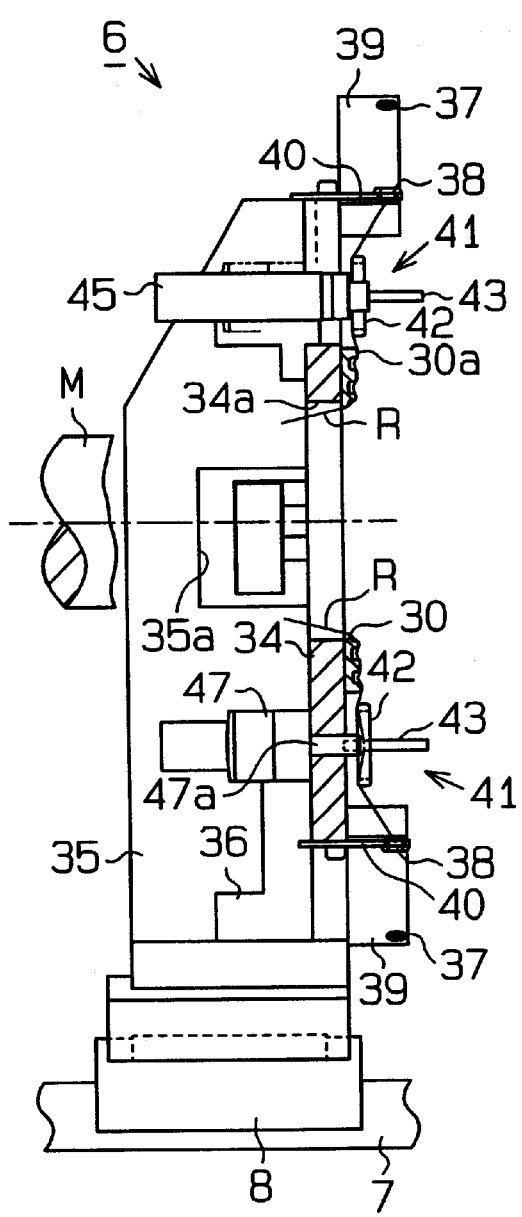
FIG. 5(a) is a schematic front view showing a hoop winding head.
Figure 5B:
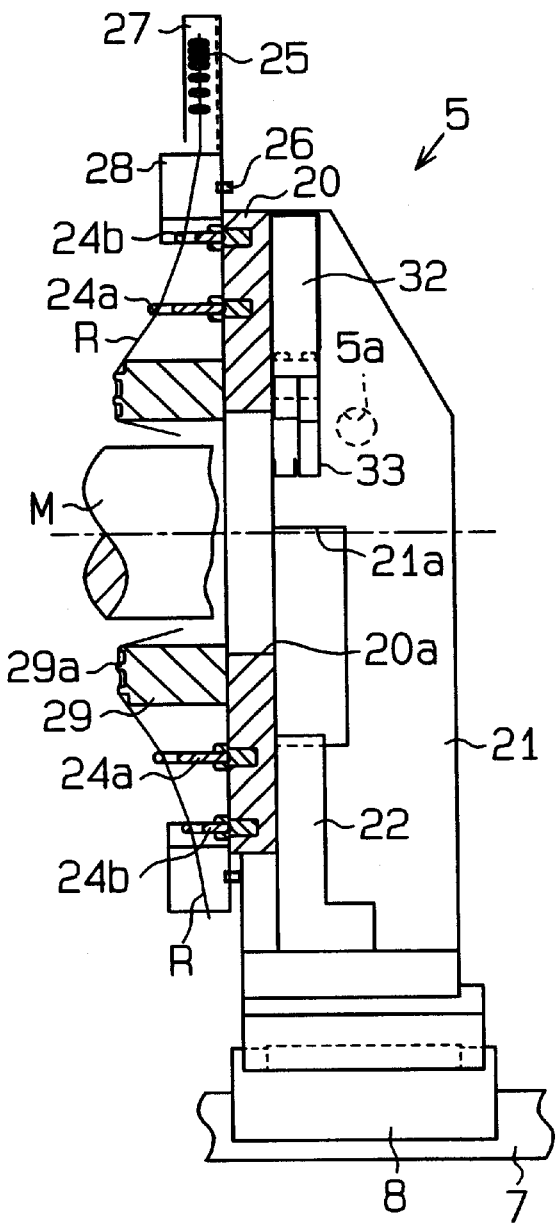
FIG. 5(b) is a schematic front view showing a helix winding head.
Figure 6A:
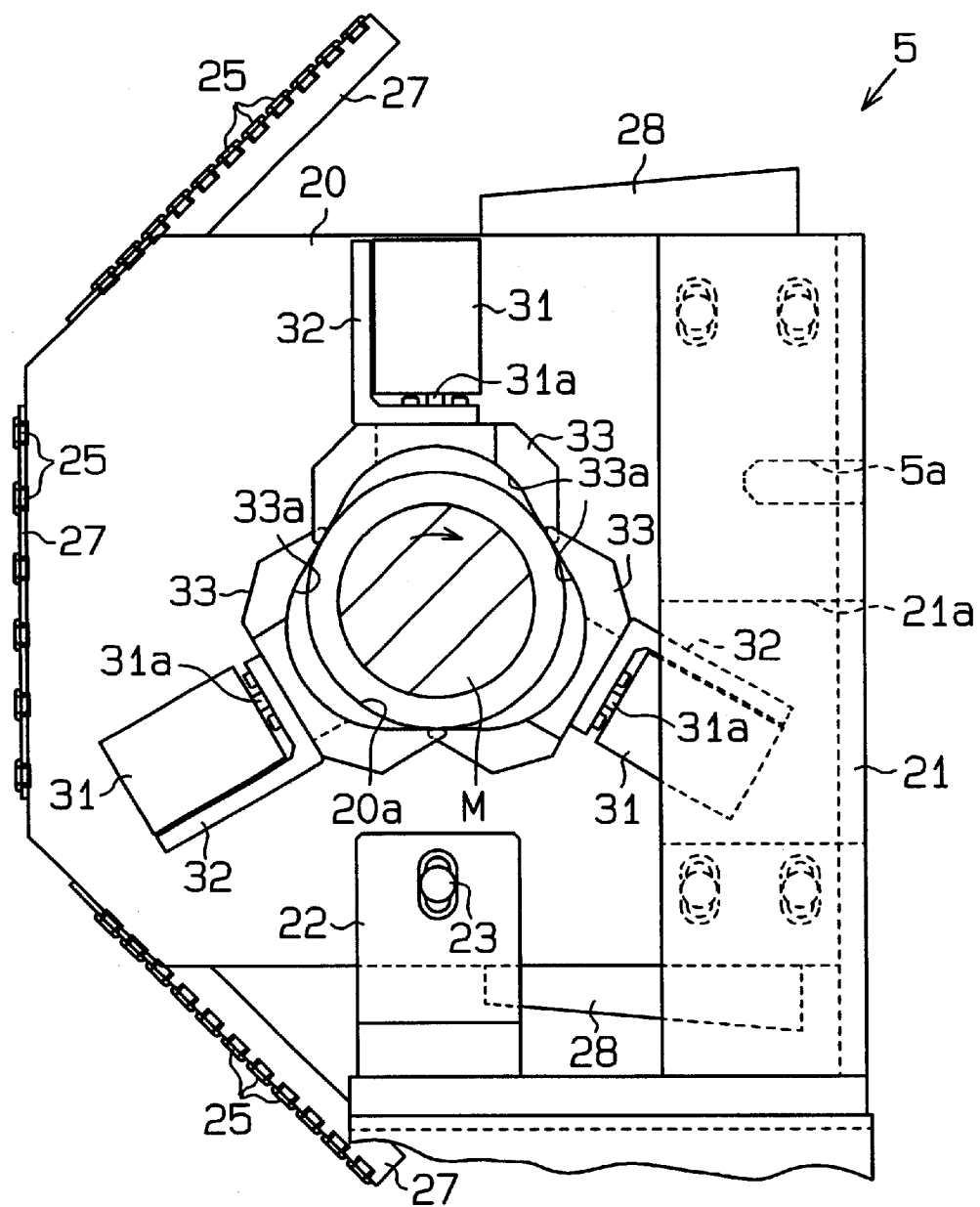
FIG. 6(a) is a schematic right view showing the helix winding head.
Figure 7A:
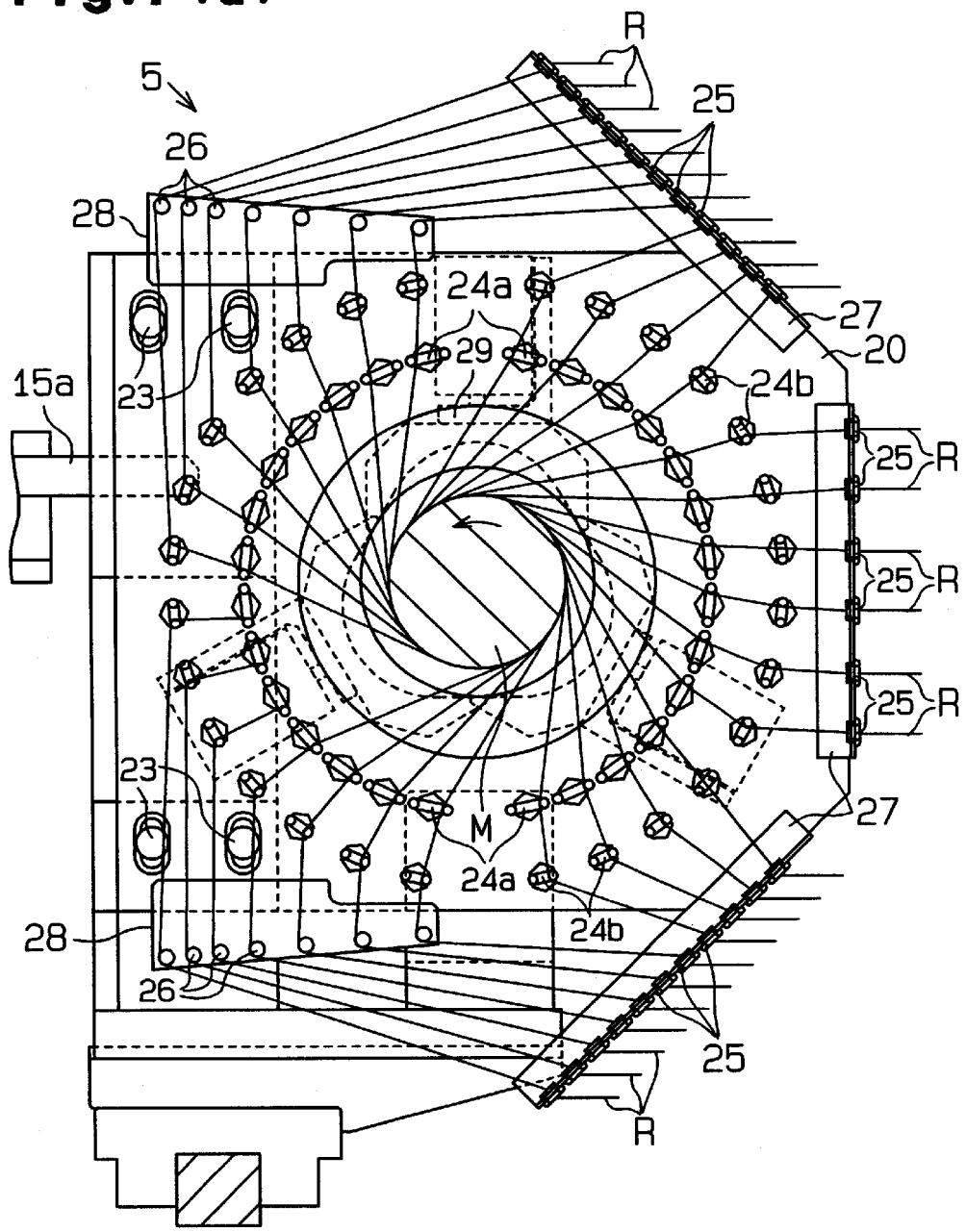
FIG. 7(a) is a schematic left view showing the helix winding head.
Figure 8:
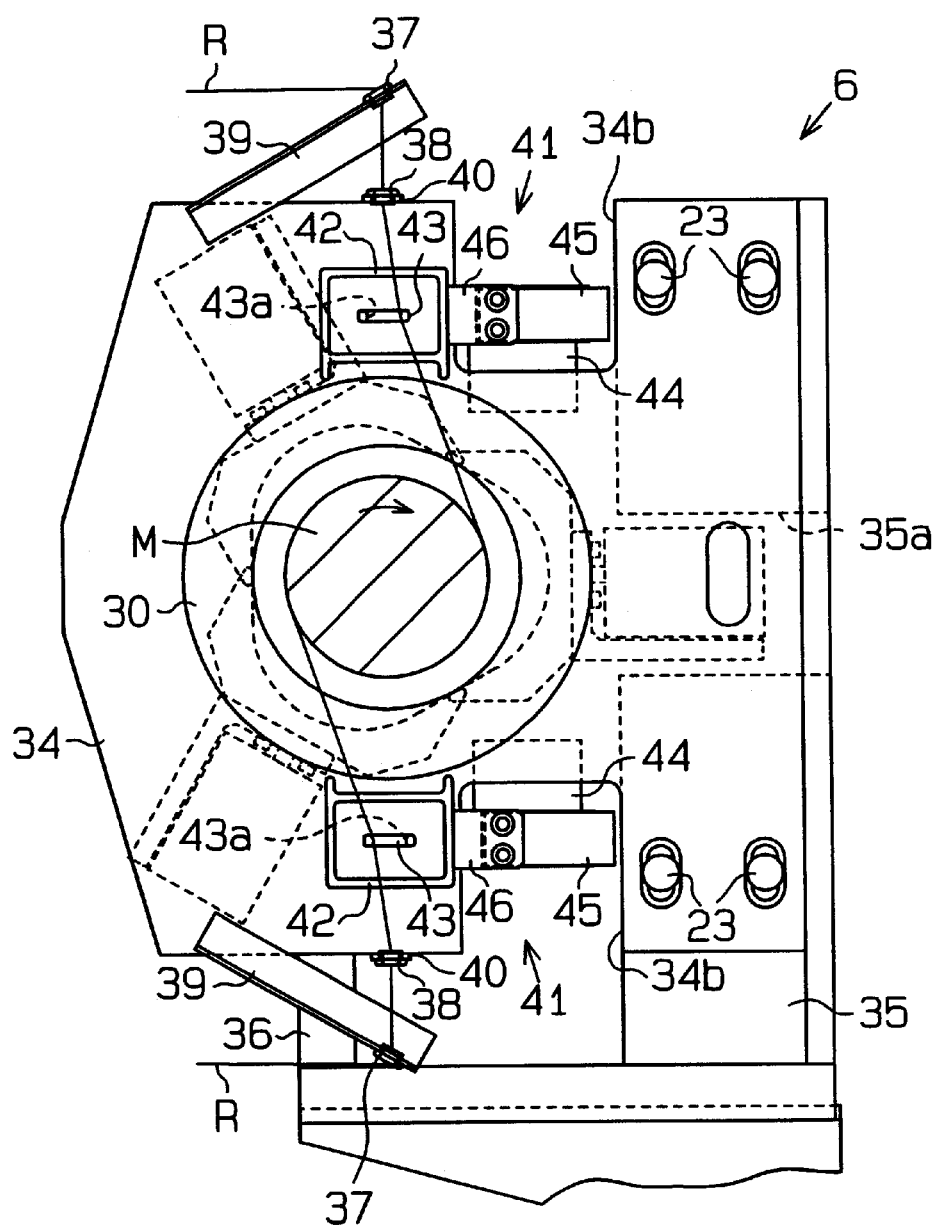
FIG. 8 is a schematic right view showing a hoop winding head.
Figure 9:
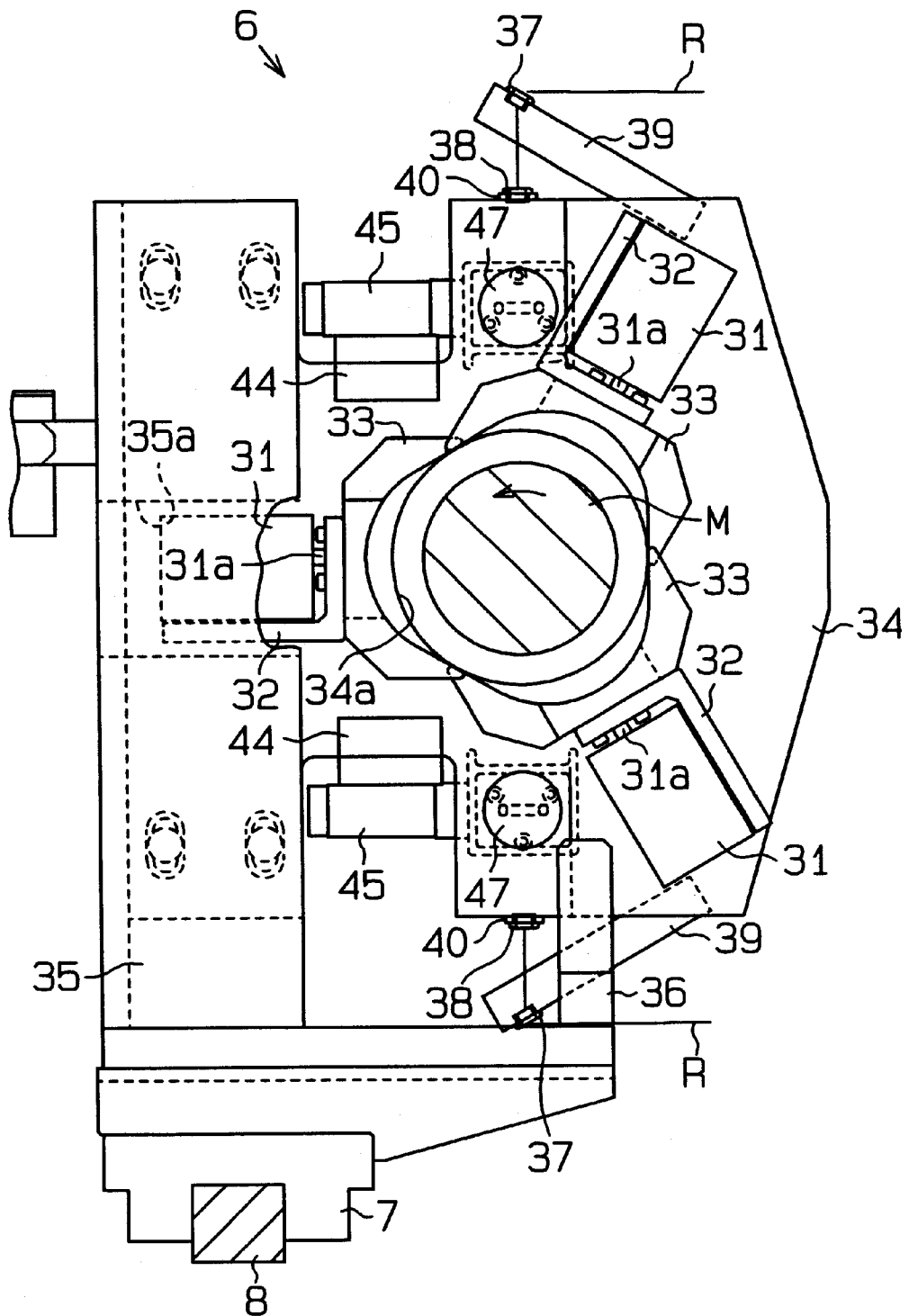
FIG. 9 is a schematic left view showing the hoop winding portion.

FIG. 4 is a schematic front view showing the helix winding head 5 and the hoop winding head 6 when they are moved integrally. FIGS. 5(a) and 5(b) are front views respectively showing the hoop winding head 6 and the helix winding head 5. FIG. 6(a) is a right view showing the helix winding head 5, and FIG. 7(a) is a left view showing the helix winding head 5. FIG. 8 is a right view showing the hoop winding head 6, and FIG. 9 is a left view showing the hoop winding head 6.

With reference to FIGS. 6(a) and 7(a), the helix winding head 5 includes a helix support plate 20. A hole 20a extends through the helix support plate 20. The mandrel M is inserted through the hole 20a. Bolts 23 secure the helix support plate 20 to a pair of blocks 21, 22 such that the vertical position of the helix support plate 20 is adjustable. Referring to FIGS. 5(b) and 7(a), a plurality of helix guides, or inner guides 24a and outer guides 24b, project from the side of the helix support plate 20 opposing the hoop winding head 6. The guides 24a, 24b are arranged along circles and about the hole 20a. The guides 24a, 24b enable the helix winding head 5 to simultaneously wind a plurality of fiber strands around the mandrel M. In the preferred embodiment, twenty-eight inner guides 24a and the same number of outer guides 24b are arranged on the helix support plate 20 to simultaneously guide twenty-eight fiber strands. The circle defined by the inner guides 24a and the circle defined by the outer guides 24b are concentric to each other.

Figure 7B:
FIGS. 7(b) and 7(c) are plan views showing guides.
Figure 7C:

Referring to FIG. 7(a), the helix winding head 5 is supplied with fiber strands R from the side opposite to the connecting rod 15a. The helix support plate 20 includes a plurality of auxiliary guides 25, 26 to smoothly guide the fiber strands R. A plurality of guide plates 27, 28 are fixed to the helix support plate 20. The auxiliary guides 25 are secured to the guide plates 27, and the auxiliary guides 26 are secured to the guide plates 28. A resin impregnating device impregnates the fiber strands R with resin. Then, the resin-impregnated fiber strands are sent to the helix winding head 5. Some fiber strands R are guided to the corresponding set of the guides 24b, 24a by way of only one auxiliary guide 25, while others are guided to the corresponding set of guides 24b, 24a by way of two auxiliary guides 25, 26. With reference to FIGS. 7(b) and 7(c), each guide 24a, 24b has an annular portion. To facilitate understanding, hatching lines are not used to indicate that the portions of the guides 24a, 24b, 25, 26 shown in FIG. 7(a) are cross-sections.

Referring to FIGS. 5(b) and 7(a), a helix fiber spreading portion 29 is located on the helix support plate 20 in the circle defined by the inner guides 24a. First annular grooves 29a are formed in the helix fiber spreading portion 29. With reference to FIG. 4, the hoop winding head 6 also includes a helix fiber spreading portion 30 at a position corresponding to the helix fiber spreading portion 29. Second annular grooves 30a are formed in the helix fiber spreading portion 30. The second grooves 30a are engaged with the first grooves 29a of the helix fiber spreading portion 29. With reference to FIG. 5(b), among the helix fiber spreading portion 29 and the guides 24a, 24b, the helix fiber spreading portion 29 is most projected from the helix support plate 20 and the outer guides 24b are least projected from the helix support plate 20. The first and second grooves 29a, 30a are not illustrated in FIGS. 7(a), 8, 12(b), and 13(b).

Referring to FIGS. 5(b) and 6(a), three equally spaced air cylinders 31 are secured to the helix support plate 20 on the side that does not include the inner and outer guides 24a, 24b. Each air cylinder 31 is fixed to the helix support plate 20 so that its piston rod 31a projects toward the axis of the mandrel M. A rubbing member 33 is secured to the distal end of each piston rod 31a by a bracket 32. The block 21 has an opening 21a at a position corresponding to one of the air cylinders 31 to avoid interference with the air cylinder 31.

Each of the rubbing members 33 has an arcuate surface, or a pressing portion 33a. The pressing portions 33a contact the fiber strands R wound around the mandrel M. In the preferred embodiment, the number of the pressing portions 33a, which are located around the mandrel M, is three. When the piston rods 31a are retracted, the rubbing members 33 are located at standby positions as shown in the state of FIG. 6(a). When the piston rods 31a are projected, the rubbing members 33 are located at pressing positions as shown in the state of FIG. 15(b). At the pressing position, each rubbing member presses the fiber strands R against the mandrel M.

Figure 6B:
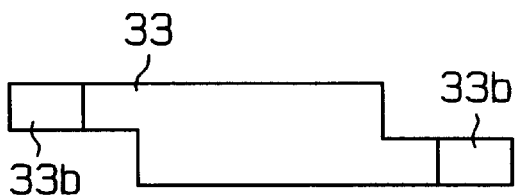
FIG. 6(b) is a schematic view showing a pressing portion of a rubbing member.

Each of the pressing portions 33a extends over and angular range of more than 120 degrees. With reference to FIG. 6(b), thin portions 33b are formed at opposite sides of each rubbing member 33. The opposing thin portions 33b extend at different levels. The thickness of the thin portions 33b is approximately half the thickness of the portion between the thin portions 33b. When the rubbing members 33 are located at the pressing positions, referring to FIG. 15(b), the thin portions 33b of each rubbing member 33 overlaps with the thin portions 33b of the adjacent rubbing member 33. In this state, the rubbing members 33 do not interfere with one another. FIG. 6(b) shows one of the rubbing members 33 as viewed from the opposite side of the pressing portion 33a.

Referring to FIGS. 8 and 9, the hoop winding head 6 includes a hoop support plate 34. A hole 34a extends through the hoop support plate 34. The mandrel M is inserted through the hole 34a. Bolts 23 secure the hoop support plate 34 to a pair of blocks 35, 36 such that the vertical position of the hoop support plate 34 is adjustable (the bolts 23 of the block 36 are not illustrated). With reference to FIGS. 5(a) and 8, the helix fiber spreading portion 30 is fixed to the hoop support plate 34 at a position corresponding to the helix fiber spreading portion 29.

A pair of first hoop guides 37 and a pair of second hoop guides 38 are formed at the side of the hoop support plate 34 that opposes the helix winding head 5. The first and second hoop guides 37, 38 guide the corresponding fiber strands R to the mandrel M. A pair of support pieces 39 is secured to the hoop support plate 34 to support the first hoop guides 37. Likewise, a pair of support pieces 40 is secured to the hoop support plate 34 to support the second hoop guides 38. The hoop guides 37, 38 extend along a vertical plane that includes the axis of the mandrel M (FIG. 8).

With reference to FIGS. 5(a), 8, and 9, a pair of hoop fiber spreading portions 41 are arranged on the hoop support plate 34. Each of the hoop fiber spreading portions 41 is located between an associated one of the second guide 38 and the helix fiber spreading portion 30. Each hoop fiber spreading portion 41 spreads a corresponding fiber strand R in accordance with the type of winding performed by the filament winding apparatus 1. That is, the fiber strands R are spread in accordance with helix winding or hoop winding. Each hoop fiber spreading portion 41 includes a first fiber spreading member 42 and a second fiber spreading member 43 that have generally frame-like shapes. The first fiber spreading member 42 extend along a plane perpendicular to the moving direction of the hoop winding head 6. The second fiber spreading member 43, which is arranged in the first fiber spreading member 42, extends parallel to the axis of the mandrel M.

Figure 13A:
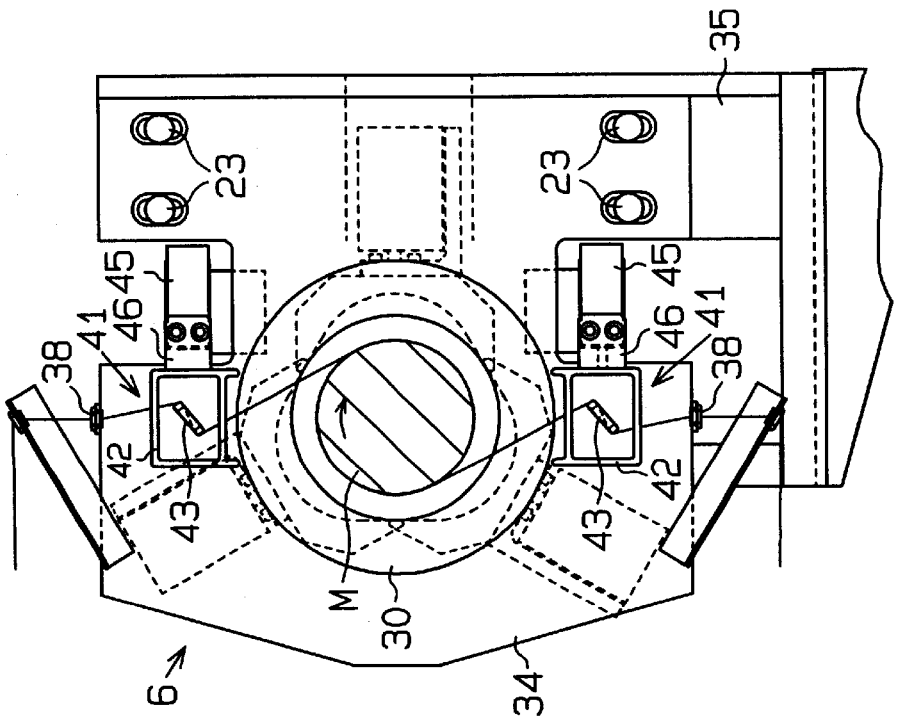
FIG. 13(a) is a schematic front view showing the hoop fiber spreading portion when spreading a fiber strand for hoop winding.
Figure 13B:
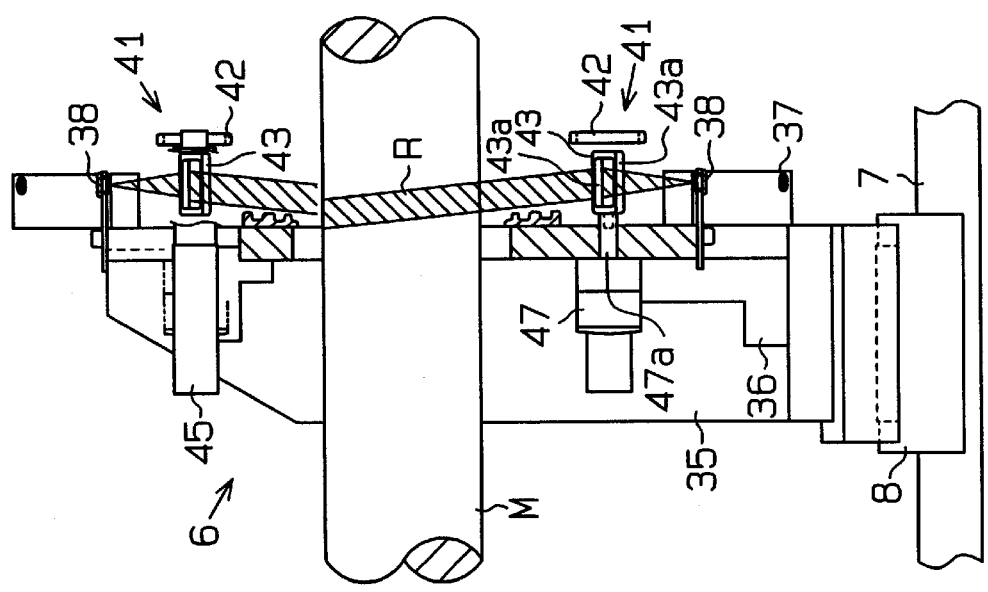
FIG. 13(b) is a schematic right view showing the state of FIG. 13(a)

A pair of cutaway portions 34b is formed in upper and lower sides of the hoop support plate 34. A pair of support brackets 44 is fixed to the support plate 34 at positions corresponding to the cutaway portions 34b. Each support bracket 44 supports a cylinder 45 that moves an associated one of the first fiber spreading member 42 in the moving direction of the hoop winding head 6. The cylinder 45 has a piston rod connected to a support piece 46, which is further connected to the first fiber spreading member 42. The cylinder 45 shifts the first fiber spreading member 42 between a contact position, which is shown in the state of FIG. 5(a), and a non-contact position, which is shown in the state of FIG. 13(a). At the contact position, the first fiber spreading member 42 guides the corresponding fiber strand R in a manner suitable for the helix winding. At the non-contact position, the first fiber spreading member 42 does not contact the fiber strand R.

The second fiber spreading members 43 each include a pair of engaging bars 43a extending parallel to the axis of the mandrel M. A pair of rotary actuators 47 is secured to the hoop support plate 34 to actuate an associated one of the second fiber spreading members 43. Each rotary actuator 47 has a shaft 47a, which is fixed to the corresponding second fiber spreading member 43. The shaft 47a of each rotary actuator 47 extends through a hole formed in the hoop support plate 34. Each rotary actuator 47 moves the corresponding second fiber spreading member 43 between a horizontal position and a vertical position, at which the second fiber spreading member 43 is rotated from the horizontal position by 90 degrees. When the second fiber spreading member 43 is located at the horizontal position, the corresponding engaging bars 43a do not contact the corresponding fiber strand R. When the second fiber spreading member 43 is located at the vertical position, the engaging bars 43a are engaged with the fiber strand R and bend the fiber strand R in a manner suitable for hoop winding. By changing the positions of the first and second fiber spreading members 42, 43, the hoop fiber spreading portions 41 shifts between a state suitable for hoop winding and a state suitable for helix winding.

Referring to FIG. 9, three equally spaced air cylinders 31 are secured to the hoop support plate 34 on the side opposite to the helix winding head 5. The air cylinders 31 each include a piston rod 31a. A rubbing member 33 is secured to the distal end of each piston rod 31a by a support bracket 32. The rubbing members 33 are identical to those of the helix winding head 5. An opening 35a is formed in the block 35 for receiving, among the three air cylinders 31, the one that extends horizontally.

Figure 10:
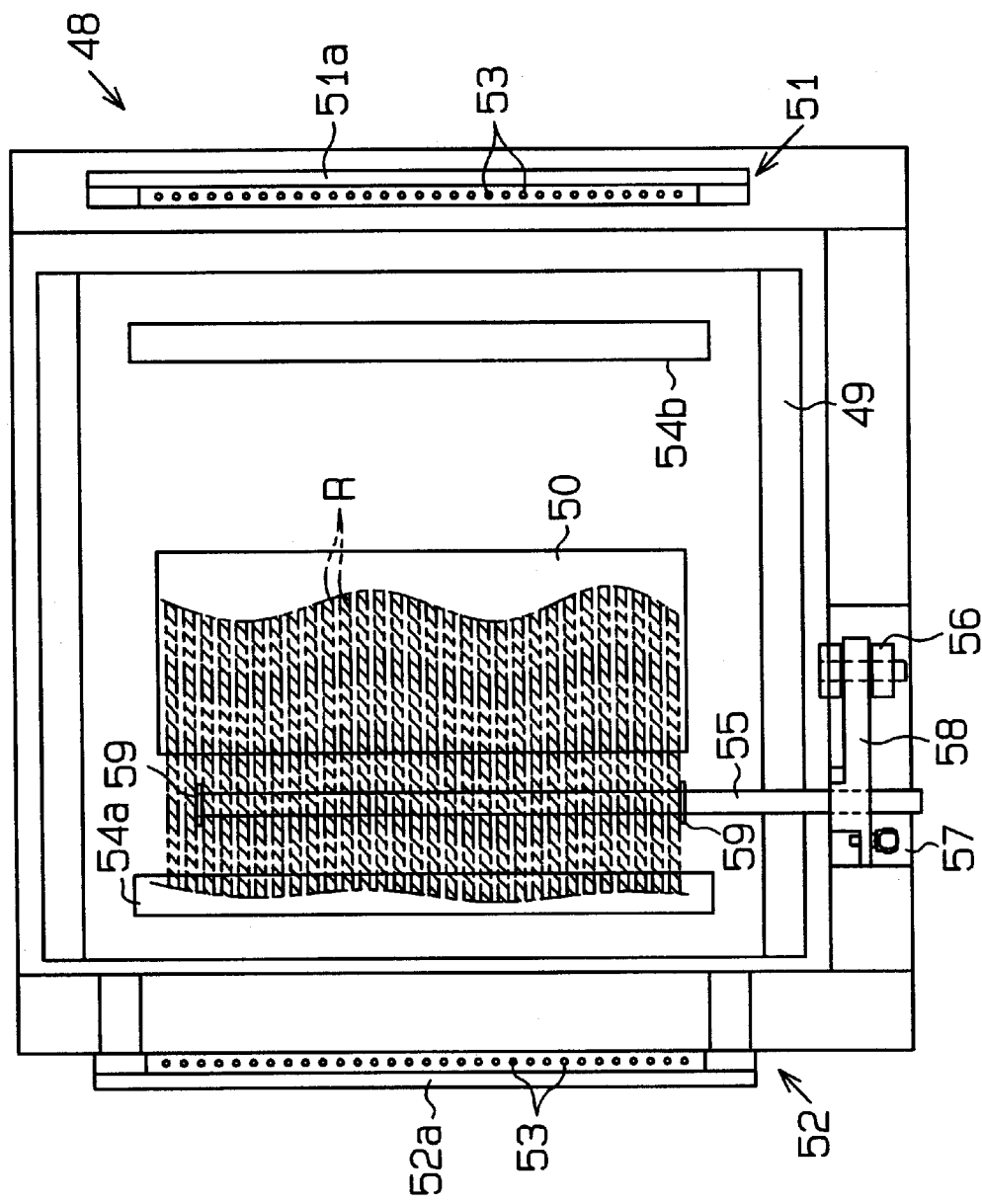
FIG. 10 is a plan view showing a resin impregnating device.
Figure 11:
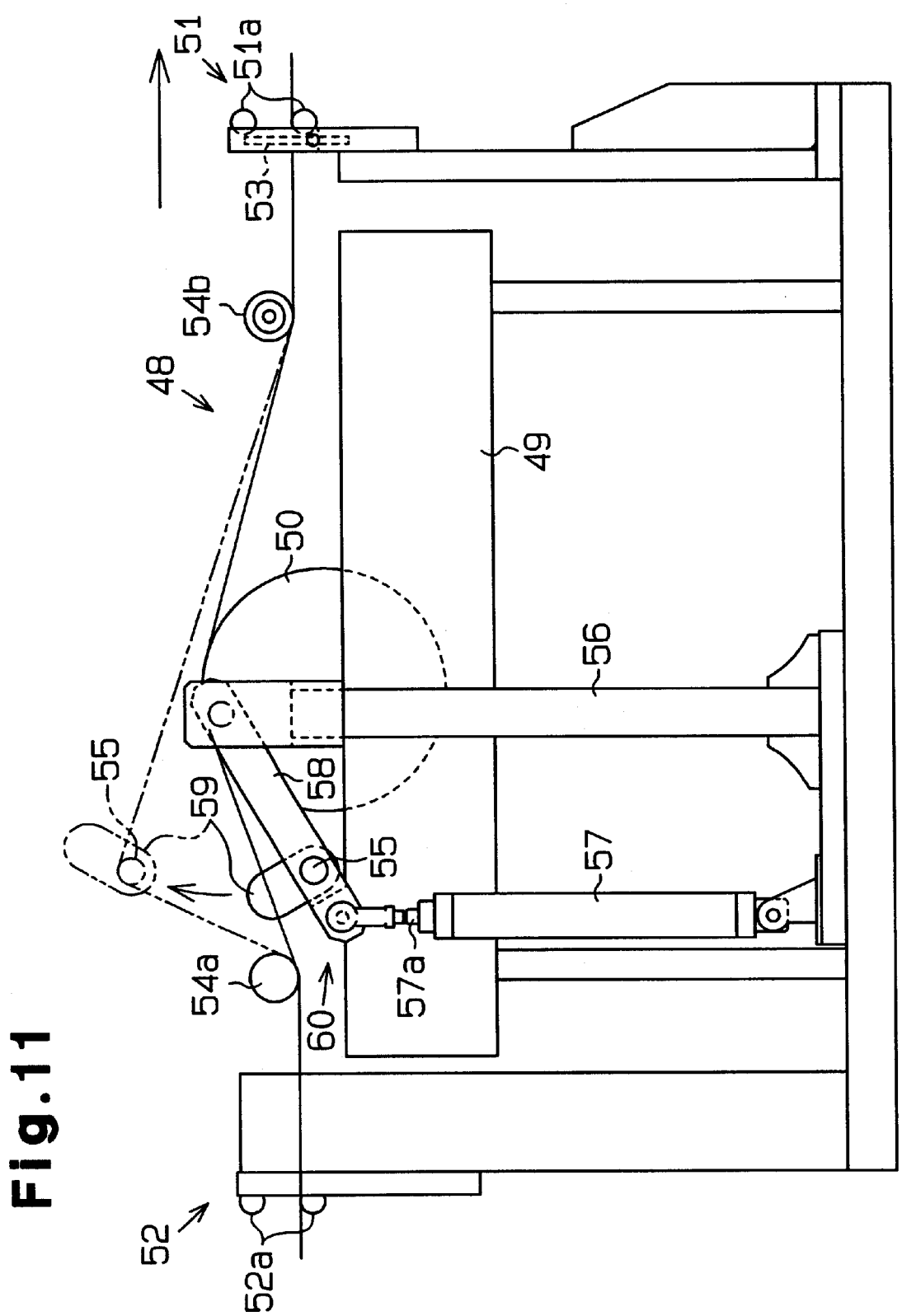
FIG. 11 is a side view showing the resin impregnating device.

Referring to FIGS. 10 and 11, the filament winding apparatus 1 includes a resin impregnating device 48. The resin impregnating device 48 has an impregnating roller 50. The resin impregnating roller 50 impregnates fiber strands R with resin before the fiber strands R are sent to the helix winding head 5 and the hoop winding head 6. The resin impregnating device 48 also has an impregnating tank 49 in which part of the impregnating roller 50 is arranged. Fiber strand guides 51, 52 are arranged near the impregnating tank 49. The fiber strand guide 51 includes a pair of upper and lower rods 51a. The rods 51a extend parallel to the impregnating roller 50. In the same manner, the fiber strand guide 52 includes a pair of upper and lower rods 52a. The rods 52a extend parallel to the impregnating roller 50. A plurality of guide pins 53 is attached to the upper and lower rods 51a to extend perpendicular to each of the rods 51a. Further, a plurality of guide pins 53, which extend perpendicular to the rods 51a, 52a, is connected to the upper and lower rods 52a.

A pair of rollers 54a, 54b is arranged on each side of the impregnating roller 50 above the impregnating tank 49, as viewed in FIG. 11. The rollers 54a, 54b extend parallel to the impregnating roller 50. The rollers 54a, 54b press the fiber strands R, which are sent from a fiber strand feeder (not shown), against the impregnating roller 50. The impregnating roller 50 and the rollers 54a, 54b are each supported by a bracket (not shown).

A pole 56 is located next to the impregnating tank 49. A bar 55, which extends parallel to the impregnating roller 50 under the fiber strands R, is located between the impregnating roller 50 and the upstream roller 54a. The bar 55 is secured to a lever 58, one end of which is pivotally supported by the pole 56 and the other end of which is pivotally connected to a piston rod 57a of a cylinder 57.

The bar 55 is long enough to engage the fiber strands R (in the preferred embodiment, the twenty-eight fiber strands R) that are sent to the helix winding head 5. Separating plates 59 are fixed to the bar 55 to separate the twenty-eight fiber strands R sent to the helix winding head 5 when helix winding is performed from the two fiber strands R sent to the hoop winding head 6 used when hoop winding is performed. The cylinder 57 moves the bar 55 between a lifting position (the state shown by the broken lines in FIG. 11 ) and a disengaging position (the state shown by the solid lines in FIG. 11 ). At the disengaging position, the bar 55 is disengaged from the fiber strands R, which are sent to the helix winding head 5. At the lifting position, the bar 55 is engaged with the fiber strands R so that the fiber strands R do not contact the impregnating roller 50. The bar 55, the cylinder 57, and the pivotal lever 58 form a separating mechanism 60 that temporarily prevents the fiber strands R from contacting the impregnating roller 50. In FIG. 10, the hatching lines show part of fiber strands R that have been pressed and spread by the roller 54a and the impregnating roller 50.

A process for fabricating an FRP tube, such as a propeller shaft body, with the filament winding apparatus 1 will now be discussed. In FIGS. 16 to 19, hatching lines are not used to indicate cross-sections. In the fabricating process, the fiber strands R are impregnated with thermosetting resin (e.g., epoxy resin) and roved carbon fibers are used as the fiber strands R.

Figure 16A:
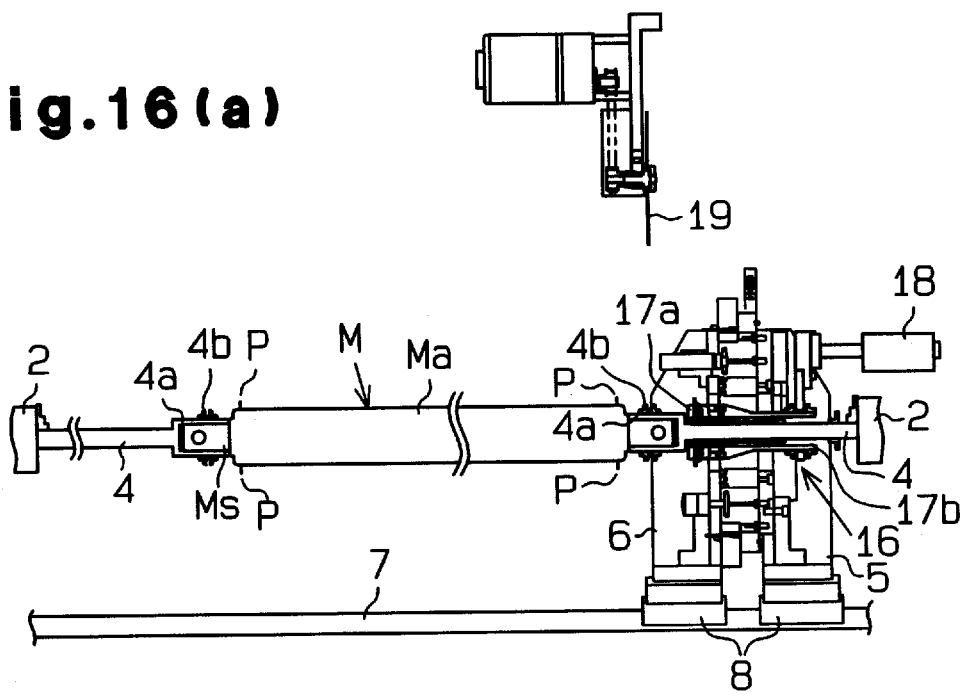
FIGS. 16(a), 16(b), and 16(c) are schematic views illustrating a winding operation performed by the apparatus of FIG. 1.

The mandrel M is first held between the two chucks 2. The helix winding head 5 and the hoop winding head 6 are then moved to a reference position (home position), as shown in the state of FIG. 16(a). Helix winding is first performed to wind the fiber strands R around the mandrel M. Thus, referring to FIG. 4, the first grooves 29a of the helix fiber spreading portion 29 are engaged with the second grooves 30a of the helix fiber spreading portion 30. Thirty fiber strands R are then sent to the helix winding head 5 and the hoop winding head 6 from the fiber strand feeder via the resin impregnating device 48. Subsequently, with reference to FIGS. 5(b) and 7(a), twenty-eight of the thirty fiber strands R are guided to the helix fiber spreading portion 29 by the corresponding guides 25, 26, 24a, and 24b of the helix winding head 5. The end of each fiber strand R is then extended through the hole 20a and held by the holders 17a, 17b of the end portion processing device 16. Further, referring to FIGS. 5(b) and 8, the remaining two fiber strands R are each guided to the corresponding hoop fiber spreading portion 41 by the corresponding hoop guides 37, 38 of the hoop winding head 6. The fiber strands R are then guided to the helix fiber spreading portion 30 where the holders 17a, 17b of the end portion processing device 16 hold the ends of the fiber strands R. The above procedures are performed manually.

In this state, the bar 55 of the resin impregnating device 48 is located at the disengaging position so that every one of the fiber strands R contacts the impregnating roller 50. As indicated by broken lines in FIG. 10, the fiber strands R are held in a spread state when impregnated with resin.

Subsequently, with reference to FIGS. 12(a) and 12(b), in the hoop fiber spreading portions 41, the first fiber spreading members 42 are engaged with the corresponding fiber strands R and the engaging bars 43a of the second fiber spreading member 43 are disengaged from the corresponding fiber strands R. In this state, the fiber strands R between the guides 38 and the mandrel M is spread first by the corresponding first fiber spreading members 42 and then by the helix fiber spreading portions 29, 30. Thus, the fiber strands R are wound around the mandrel M in a spread state that is suitable for helix winding. FIG. 12(a) shows a state in which the hoop winding head 6 moves to the right to wind the fiber strands R to the mandrel M.

Figure 15A:
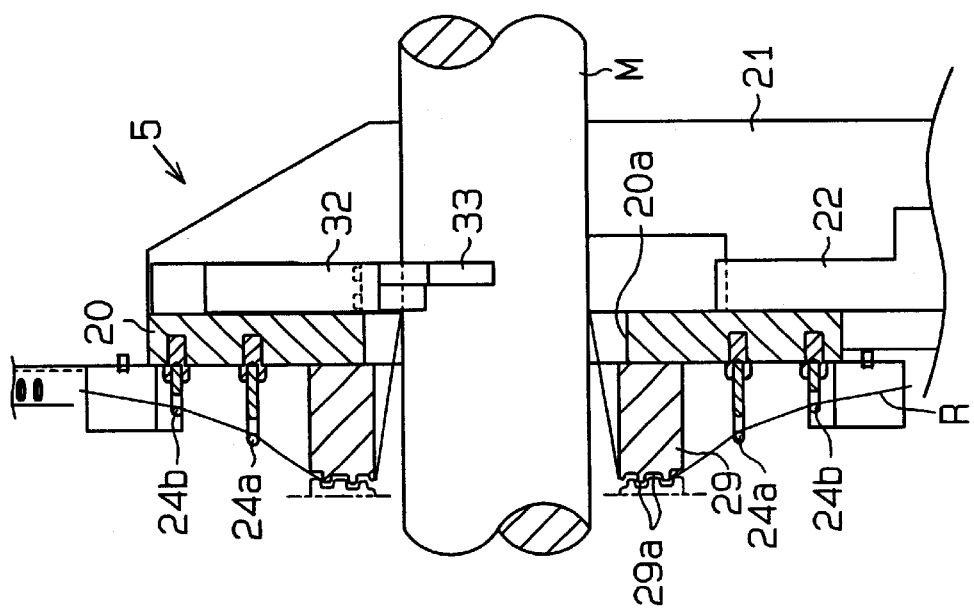
FIG. 15(a) is a schematic cross-sectional view showing the helix winding head in a state in which rubbing members are held at standby positions.
Figure 15B:
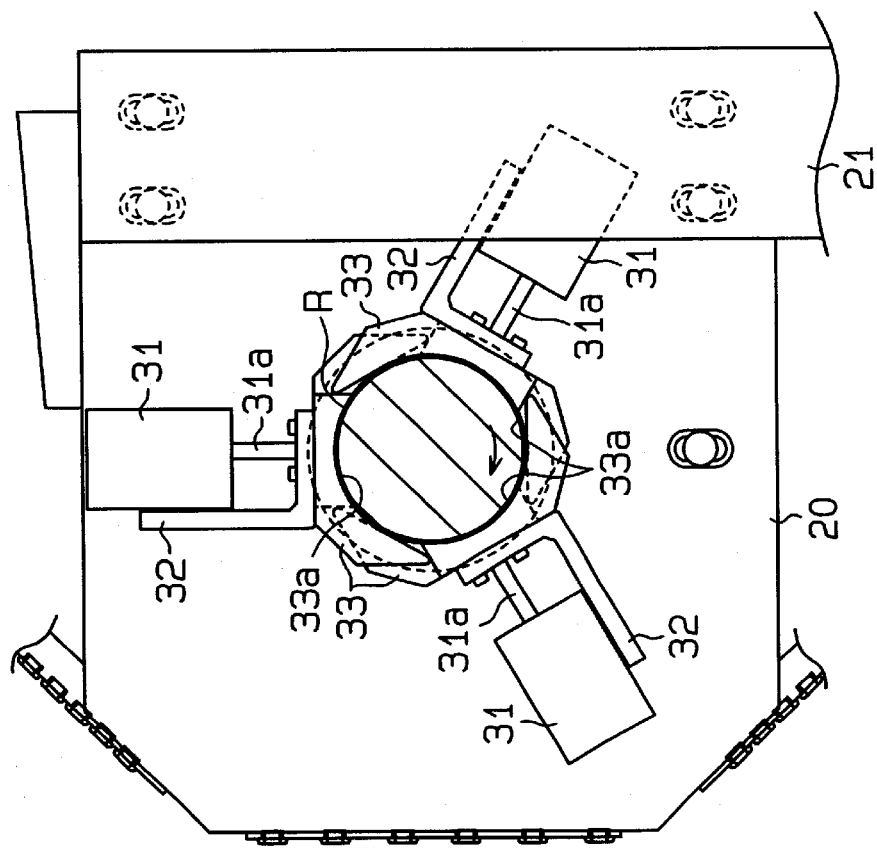
FIG. 15(b) is a schematic right view showing the state of FIG. 15(a)

The rubbing members 33, referring to FIGS. 15(a) and 15(b), are positioned so that the pressing portions 33a press the fiber strands R against the mandrel M.

Figure 16B:
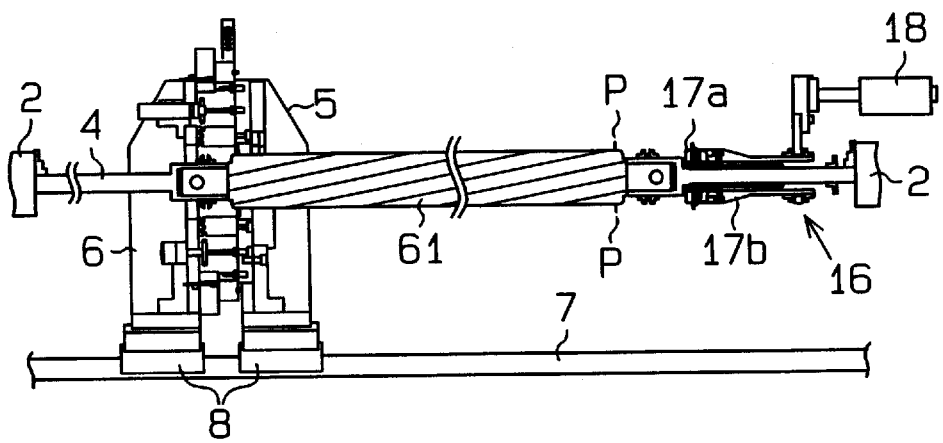
Figure 16C:
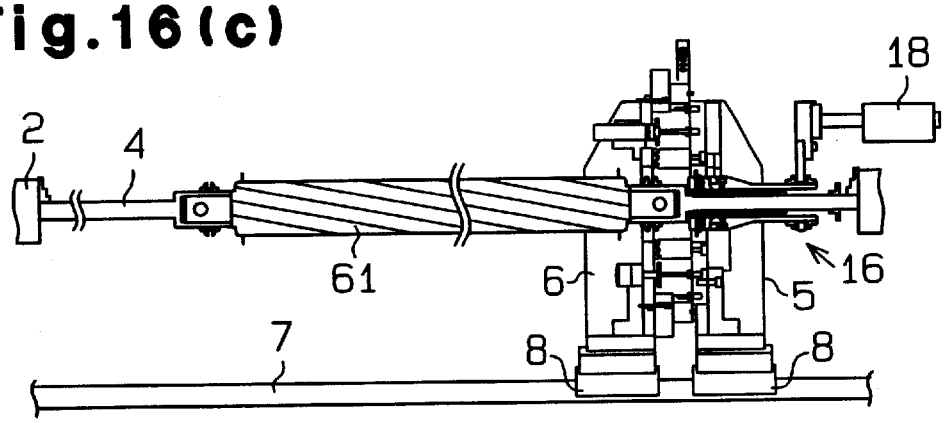

In this state, the helix winding head 5 and the hoop winding head 6 are integrally moved toward the left from the reference position shown in the state of FIG. 16(a) to a winding initiating position (the same positions as those illustrated in FIG. 16(c)). The filament winding apparatus 1 then starts to perform helix winding. More specifically, the helix winding head 5 and the hoop winding head 6 move integrally toward the left from the winding initiating position while the chucks 2 rotate the mandrel M in a certain direction. Accordingly, the fiber strands R from the fiber strand feeder, which have been impregnated with resin by the resin impregnating device 48, are wound around the mandrel M to form a first helix winding layer 61. The first helix winding layer 61 is completed when the gap between the helix winding head 5 and the hoop winding head 6 reaches a position corresponding to the left end of the mandrel M, as viewed in the state of FIG. 16(b).

During the helix winding, the guides 24b, 24 a guide the fiber strands R, which are sent to the helix winding head 5, to the first and second grooves 29a, 30a of the helix fiber spreading portions 29, 30 so that the fiber strands R are equally spaced from one another when wound around the mandrel M. The fiber strands R supplied to the hoop winding head 6 are wound around the mandrel M in a spread state that is suitable for helix winding.

Figure 17A:
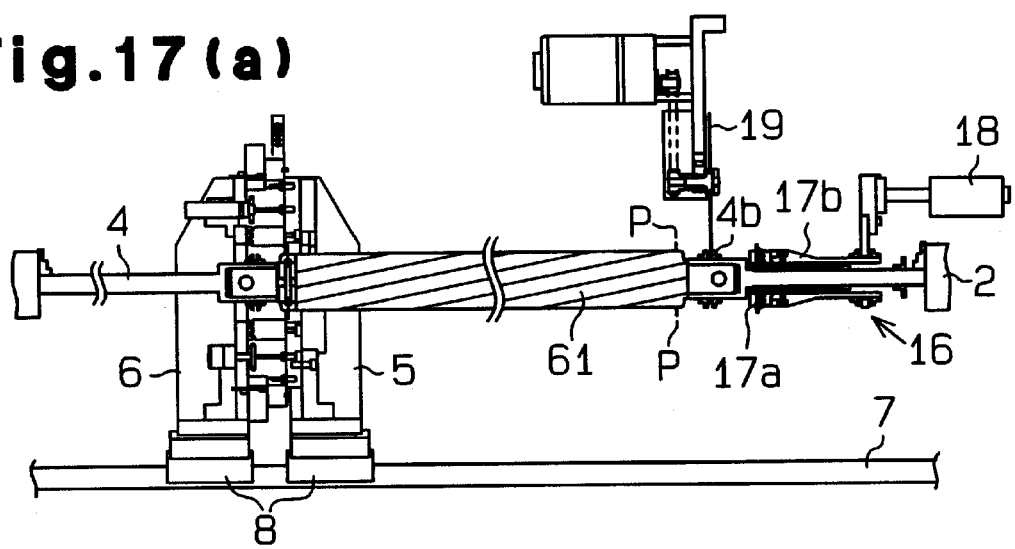
FIGS. 17(a), 17(b), and 17(c) are schematic views illustrating a winding operation performed by the apparatus of FIG. 1.

Subsequently, the helix winding head 5 and the hoop winding head 6 are moved toward the right from the state show in FIG. 16(b) until the gap between the helix winding head 5 and the hoop winding head 6 reaches a position corresponding to the right end of the mandrel M, as shown in the state of FIG. 16(c). This forms a second helix winding layer 61. When the second helix winding layer 61 is formed, the winding direction of the fiber strands R is opposite to that of the fiber strands R when forming the first helix winding layer 61. The helix winding head 5 and the hoop winding head 6 are then moved toward the left from the state shown in FIG. 16(c) to form a third helix winding layer 61. The winding direction of the fiber strands R in the third helix winding layer 61 is the same as those in the first helix winding layer 61. In this state, with reference to FIG. 17(a), the rotary cutter 19 moves to the cutting position to cut the fiber strands R, which are held by the end portion processing device 16. The rotary cutter 19 completes the cutting of the fiber strands R before the gap between the helix winding head 5 and the hoop winding head 6 reaches the position corresponding to the left end of the mandrel M, as shown in the state of FIG. 17(a), and completes the formation of the third helix winding layer 61.

Figure 17B:
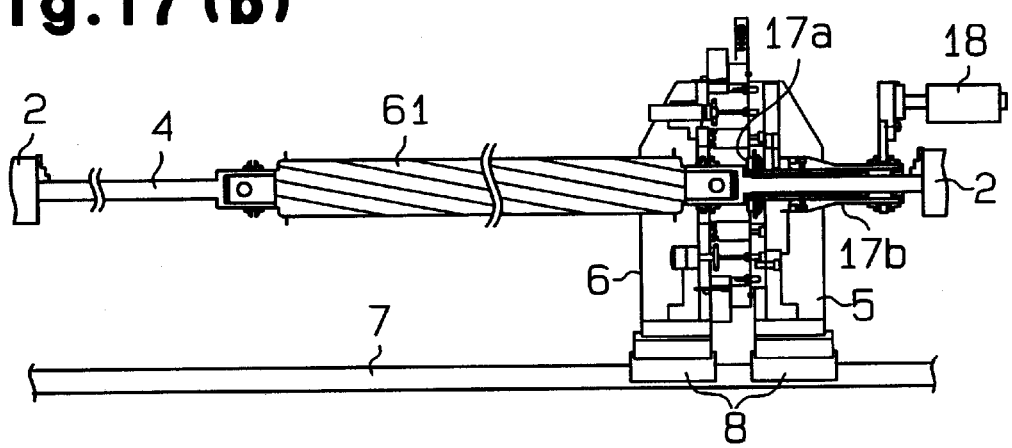

After the cutting of the fiber strands R is completed, the rotary cutter 19 returns to the standby position and the movable holder 17b shifts to the release position. The movable holder 17b thus releases the ends of the fiber strands R, which are removed by a removing device (not shown). The removing device has a suction nozzle or an injection nozzle, which blasts compressed air, and a scraping portion, which includes a brush or a scraper. After the removing device starts to remove the released ends, the helix winding head 5 and the hoop winding head 6 are moved toward the right from the state shown in FIG. 17(a) to form a fourth helix winding layer 61. The removal of the released ends is completed before the gap between the helix winding head 5 and the hoop winding head 6 reaches the position corresponding to the right end of the mandrel M and completes the formation of the fourth helix winding layer 61, as shown in the state of FIG. 17(b). The winding direction of the fiber strands R in the fourth helix winding layer 61 is the same as those in the second helix winding layer 61.

Figure 17C:
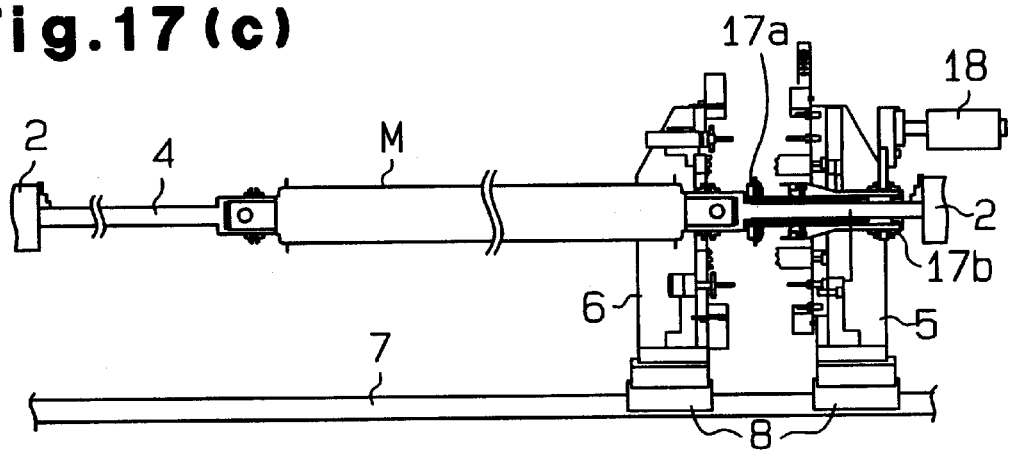

Next, with reference to FIG. 17(c), the helix winding head 5 and the hoop winding head 6 are separated from each other. More specifically, the hoop winding head 6 is separated from the connecting rod 15b in the state shown in FIG. 17(b). Further, the drive plate 12 moves rightward to the reference position from the state shown in FIG. 17(b) with a stopper (not shown) engaging the hoop winding head 6 so that only the helix winding head 5 moves. Then, referring to FIG. 17(c), the helix winding head 5 is separated from the connecting rod 15a, and a stopper (not shown) is engaged with the helix winding head 5.

Subsequently, after the fiber strands R are wound between the holders 17a, 17b, the holder 17b is moved to the hold position. Further, the drive plate 12 is moved to a position at which the connecting rod 15b opposes the hoop winding head 6. The hoop winding head 6 and the connecting rod 15b are connected to each other again, and the hoop winding head 6 is disengaged from the stopper. In this state, the hoop winding head 6 moves integrally with the drive plate 12. Also, the bar 55 of the resin impregnating device 48 is arranged at the lifting position to prevent the fiber strands R from contacting the impregnating roller 50. In this state, the hoop winding head 6 is moved toward the left from the state shown in FIG. 17(c). Further, the rotary cutter 19 starts cutting the fiber strands R that extends continuously from the end portion processing device 16 to the mandrel M. The cutting is completed before the hoop winding head 6 reaches a hoop winding initiating position, as shown in the state of FIG. 18(a).

Figure 18A:
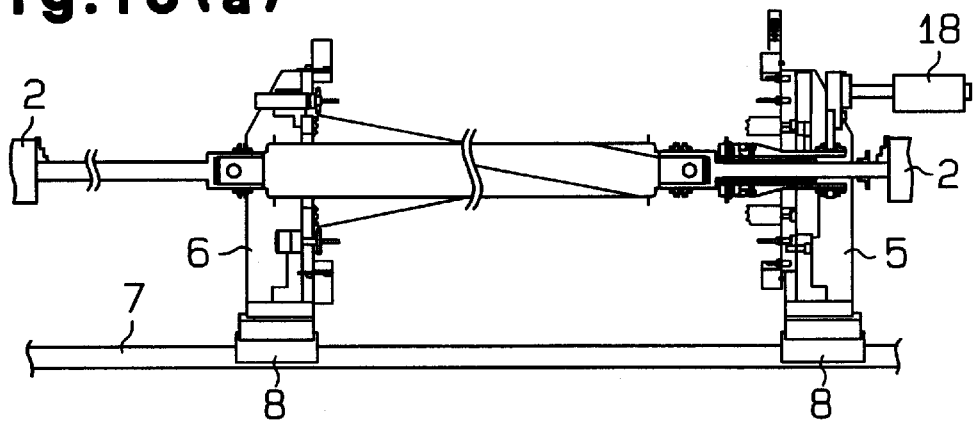
FIGS. 18(a), 18(b), and 18(c) are schematic views illustrating a winding operation performed by the apparatus of FIG. 1.
Figure 18B:
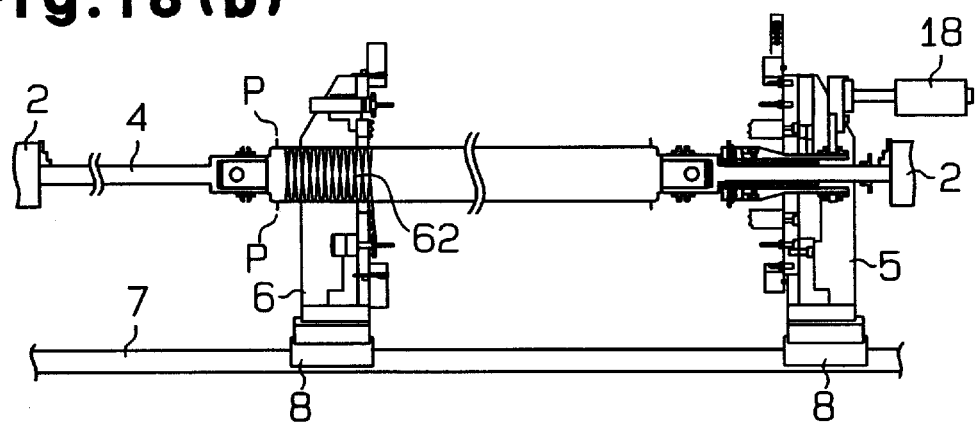

In the state of FIG. 18(a), the hoop fiber spreading portion 41 are switched to a fiber spreading state that is suitable for hoop winding. In other words, with reference to FIGS. 13(a) and 13(b), the cylinders 45 move the associated first fiber spreading members 42 so that they do not contact the corresponding fiber strands R. In this state, the associated second fiber spreading members 43 are rotated by the rotary actuators 47 by about 120 degrees from the horizontal state shown in FIGS. 12(a) and 12(b) so that the engaging bars 43a engage the fiber strand R.

Figure 18C:
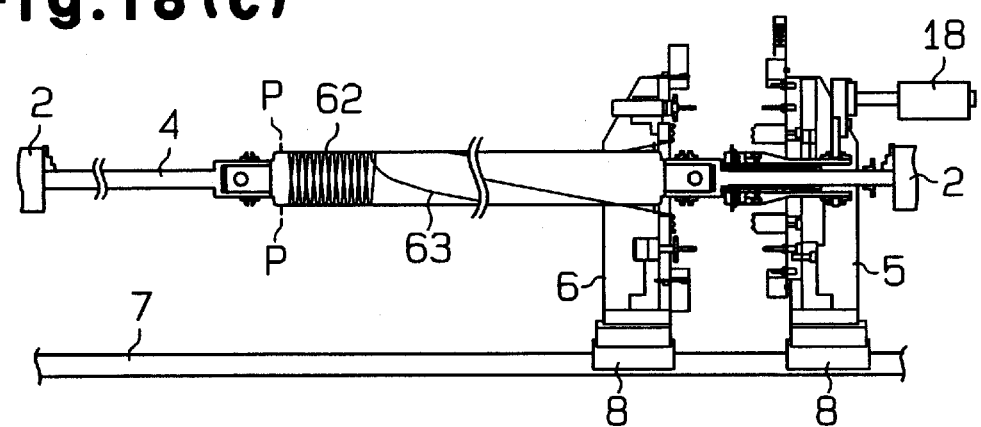

The mandrel M is then rotated at a speed that is equal to the speed at which the mandrel M was rotated when forming the helix winding layers 61. Further, the hoop winding head 6 is moved at a speed that is lower than the speed at which the hoop winding head 6 was moved when forming the helix winding layers 61. This forms a left hoop winding layer 62 at a predetermined position on the left end of the mandrel M, as viewed in FIG. 18(b). The fiber strands R of the left hoop winding layer 62 are wound around the mandrel M at an angle of approximately 90 degrees relative to the axis of the mandrel M. Next, the hoop fiber spreading portions 41 are arranged so that they spread the corresponding fiber strands R. The fiber strands R that are spread in this state are used as crossing threads 63. Afterwards, the hoop winding head 6 is moved toward the right from the state shown in FIG. 18(b) so that the crossing threads 63 are wound to the mandrel M at the same angle as the fiber strands R wound to the mandrel M when forming the second and fourth helix winding layers 61. The crossing threads 63 are wound around the mandrel M at the same angle as when helix winding was performed until the hoop winding head 6 reaches a further hoop winding initiating position at the other end of the mandrel M, as shown in the state of FIG. 18(c).

Figure 19A:
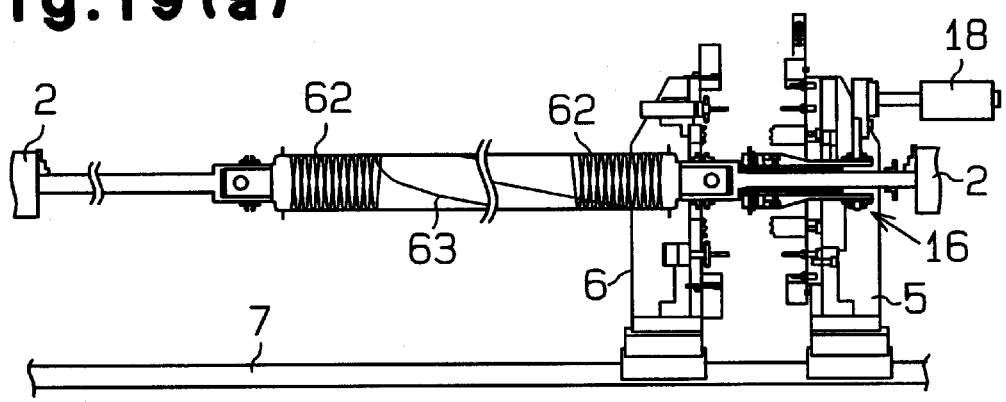
FIGS. 19(a), 19(b), and 19(c) are schematic views illustrating a winding operation performed by the apparatus of FIG. 1.
Figure 19B:
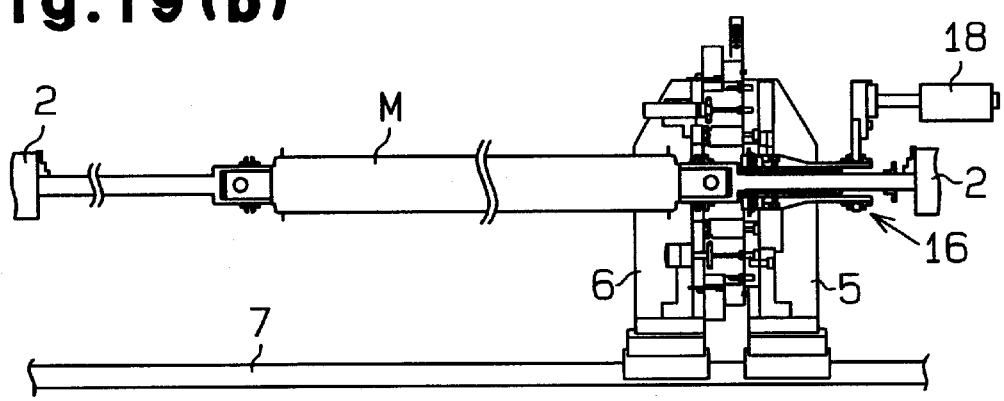
Figure 19C:
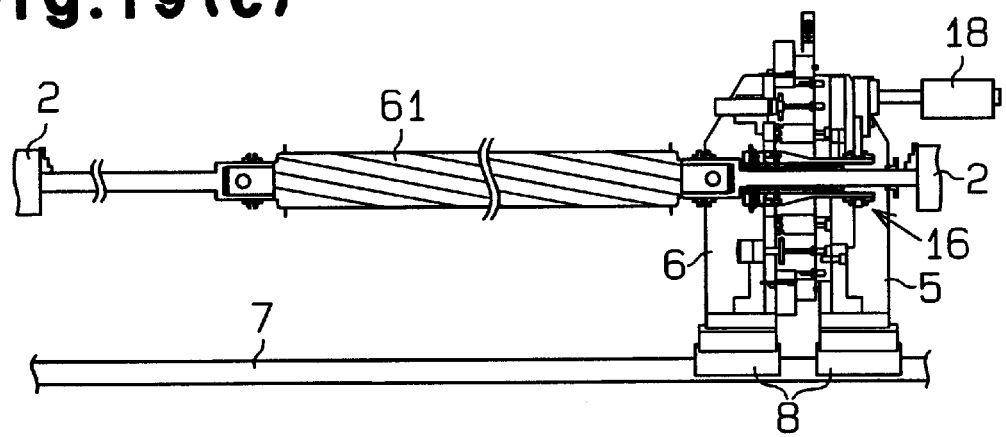

The hoop fiber spreading portions 41 are then arranged to spread the fiber strands R into a state suitable for hoop winding. A left hoop winding layer 62 is then formed on the mandrel M as shown in the state of FIG. 19(a). In this state, the hoop winding head 6 is separated from the connecting rod 15b, and the stopper is engaged with the hoop winding head 6. The drive plate 12 is then moved to a position at which the connecting rod 15a opposes the helix winding head 5. The helix winding head 5 is then connected to the connecting rod 15a. Further, the helix winding head 5 is moved and connected to the hoop winding head 6, as shown in the state of FIG. 19(b). Subsequently, the hoop winding head 6 is connected to the connecting rod 15b again and the hoop fiber spreading portions 41 are arranged in the state that is suitable for the helix winding. Helix winding is then performed again as described above. More specifically, the helix winding head 5 and the hoop winding head 6 are integrally moved toward the left, as viewed in FIG. 19(b), to form a fifth helix winding layer 61. Subsequently, the helix winding head 5 and the hoop winding head 6 are then integrally moved to the right and form a sixth helix winding layer 61, as shown in the state of FIG. 19(c).

The helix winding layers 61 are not shown in FIGS. 17(c), 18(a) to 18(c), 19(a), and 19(b).

Afterward, the end portion processing device 16 processes the end portions of the fiber strands R as described above. The mandrel M is then removed from the chucks 2 and the rotary shafts 4, and the pins P are detached from the mandrel M. Next, the mandrel M, on which the helix winding layers 61 and the hoop winding layers 62 are formed, is placed in a heating furnace to harden the resin at a predetermined temperature. The fabricated product, or the FRP pipe 64, is then cooled, and each end of the FRP pipe 64 is cut at a position axially inward from where the pins P were located. Finally, the FRP pipe 64 is removed from the mandrel M. This obtains the propeller shaft body, which has predetermined dimensions.

When helix winding is performed, the set of pressing portions 33a of the rubbing members 33 located to the rear relative to the moving direction of the helix winding head 5 and the hoop winding head 6 press the fiber strands R wound around the mandrel M. This removes excessive resin from the fiber strands R. When hoop winding is performed, the rubbing members 33 are held at the standby position and do not press the fiber strands R. However, the rubbing members 33 do not necessarily have to be held at the standby position as long as they do not press the fiber strands R.

In the FRP pipe, helix winding layers 61 formed by winding fiber strands R in one direction, such as that shown in FIG. 1(b), are superimposed with helix winding layers 61 formed by winding fiber strands R in an opposite direction. Further, referring to FIG. 1(c), hoop winding layers 62 are formed on opposite ends of the FRP pipe 64. The crossing threads 63 continuously connect the hoop winding layers 62. FIG. 1(c) does not show the helix winding layers 61.

The first embodiment has the advantages described below.

(1) In the FRP pipe 64, the hoop winding layers 62 are formed on each end of the helix winding layers 61. The hoop winding layers 62 are formed from continuous reinforced fibers (fiber strands R). That is, after forming one of the hoop winding layers 62, the other is formed without cutting the fiber strands R. This improves productivity.

(2) The crossing threads 63, which connect the hoop winding layers 62 to each other, are wound around the mandrel M at an angle equal to the winding angle of the fiber strands R of the helix winding layers 61. Accordingly, even if organic fibers that are not impregnated with resin are wound around the completed helix and hoop winding layers 61, 62, the crossing threads 63 do not appear outstanding relative to the helix winding layers 61. This improves the appearance of the FRP pipe 64.

(3) The filament winding apparatus 1 includes the helix fiber spreading portion 29, which simultaneously spreads the fiber strands R, the helix winding head 5 and the hoop fiber spreading portions 41, which performs helix winding of the fiber strands R, and the hoop winding head 6, which performs hoop winding. Thus, when the fiber strands R are wound around the mandrel M, the fiber strands R are spread regardless of whether helix winding or hoop winding is performed. Further, during helix winding, the fiber strands R are guided supplied to the mandrel M by the guides 24b, 24a, which are arranged about the mandrel M. Accordingly, when the winding direction of the fiber strands R is switched at one of the two ends of the mandrel M, the helix winding head 5 does not overhang from the mandrel M.

(4) The winding unit 3 includes the helix winding head 5 and the hoop winding head 6, which move integrally with or separately from each other. Thus, even if the end portion processing device 16, which processes the winding initiating end and the winding terminating end of each fiber strand R wound around the mandrel M, is located at only one side of the filament winding apparatus 1, helix winding and hoop winding are performed without the helix and hoop winding heads 5, 6 interfering with each other. Further, an additional driving mechanism is not required to drive the end portion processing device 16.

(5) The helix winding head 5 and the hoop winding head 6 are provided with the rubbing members 33, which have the pressing portions 33a. The pressing portion 33a presses the fiber strands R, which are impregnated with resin, against the mandrel M. Thus, when the helix and hoop winding heads 5, 6 move, the rubbing members 33 automatically remove excessive resin from the fiber strands R wound around the mandrel M and defoam the resin of the fiber strands S.

(6) The pressing portions 33a are arranged to encompass the entire circumference of the mandrel M. This improves the resin removing effect of the rubbing members 33.

(7) The helix fiber spreading portion 29 of the helix winding head 5 includes the first grooves 29a. The first grooves 29a are engaged with the second grooves 30a, which are formed in the helix fiber spreading portion 30 of the hoop winding head 6. The fiber strands R are guided to the first and second grooves 29a, 30a by the guides 24a, 24b, which are arranged about the mandrel M. Accordingly, the fiber strands R are spread by simply engaging the first annular grooves 29a with the second annular grooves 30a.

(8) The hoop fiber spreading portions 41 of the hoop winding head 6 include the second fiber spreading members 43, each of which has two engaging bars 43a. The engaging bars 43a are parallel to the axis of the mandrel M to bend the fiber strands R sent to the mandrel M. Thus, the spreading of the fiber strands R that is suitable for hoop winding is performed with a simple structure.

(9) Each hoop fiber spreading portion 41 includes the generally frame-like first fiber spreading member 42 and second fiber spreading member 43. The first fiber spreading member 42 is arranged along a plane perpendicular to the moving direction of the hoop winding head 6. The second fiber spreading member 43 extends perpendicular to the first fiber spreading member 42 and extends through the first fiber spreading member 42. The positions of the first and second fiber spreading members 42, 43 are changed such that the fiber strands R are spread in a manner suitable for the desired winding (i.e., hoop winding or helix winding). This also spreads the crossing threads 63 wound around the mandrel M in an optimal state. Further, helix winding is performed with the fiber strands R maintained in an optimally spread state when the helix winding head 5 and the hoop winding head 6 are moved integrally with each other.

(10) When the hoop winding head 6 winds the crossing threads 63 around the mandrel M, the movement of the hoop winding head 6 is controlled so that the winding angle of the crossing threads 63 is the same as the winding angle of the fiber strands R when helix winding is performed. A controller (not shown) controls the movement of the hoop winding head 6. Thus, the crossing threads 63 are easily wound around the mandrel M at the same angle as the angle of the fiber strands R wound to the mandrel M when performing helix winding.

(11) The filament winding apparatus 1 is provided with the resin impregnating device 48, which includes the impregnating roller 50 and the separating mechanism 60. The impregnating roller 50 impregnates the fiber strands R when helix winding and hoop winding are performed. When hoop winding is performed, the separating mechanism 60 temporarily lifts the fiber strands R that are used for helix winding so that they do not contact the impregnating roller 50. In this state, the impregnating roller 50 does not apply force to the fiber strands R that are used for helix winding. This structure impregnates the fiber strands R used for the helix winding and the fiber strands R used for hoop winding with the single resin impregnating device 48. Accordingly, the filament winding apparatus 1 is more compact in comparison to when different resin impregnating devices are used for helix winding and hoop winding.

(12) The pressing portions 33a of the rubbing members 33 encompass the entire circumference of the mandrel M. Further, as described above, the steps 33b formed on each side of the middle portion of each rubbing member 33 have a thickness that is substantially half the thickness of the middle portion. The steps 33b of each rubbing member 33 extend parallel to each other at different levels. Thus, when the rubbing members 33 are located at the pressing positions, part of each rubbing member 33 overlaps part of the adjacent rubbing member 33 in the axial direction of the mandrel M. The rubbing members 33 thus do not interfere with one another. Thus, the rubbing members 33 and their drive mechanisms (the air cylinders 31) do not occupy much space.

Second Embodiment

Figure 20:
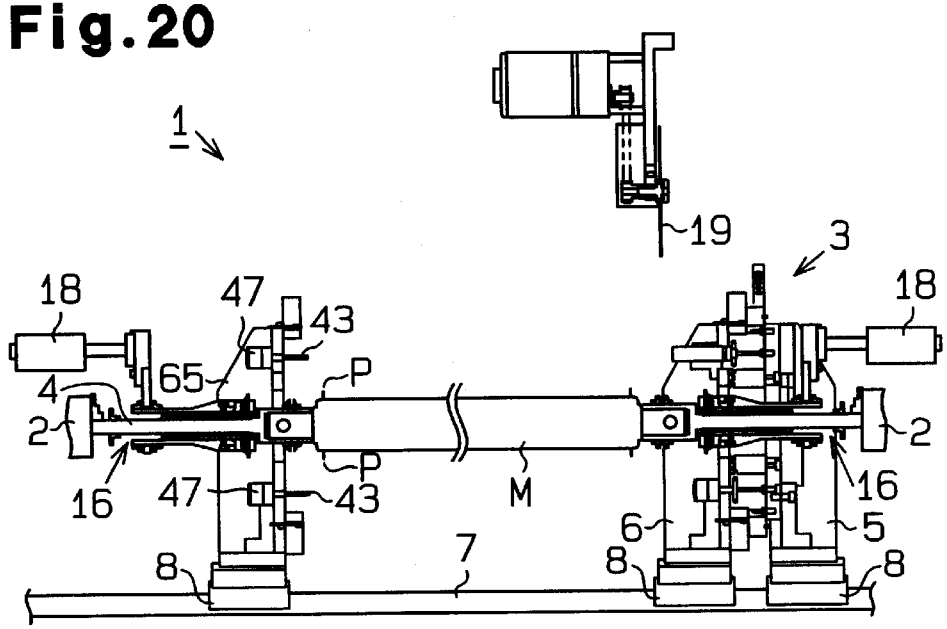
FIG. 20 is a schematic front view showing a filament winding apparatus according to a second embodiment the present invention.

A second embodiment of the present invention will now be described with reference to FIG. 20. The filament winding apparatus 1 of the second embodiment differs from that of the first embodiment in that the apparatus 1 includes a third winding head, or squeezing fiber winding head 65, in addition to the helix winding head 5 and the hoop winding head 6 and in that the end portion processing device 16 is provided for each end of the mandrel M. In FIG. 20, elements that are like or identical to those shown in FIGS. 1 to 19 are denoted with the same reference numeral. Such like elements will not be described below. Also, although not shown in FIG. 20, a rotary cutter 19 is provided in correspondence with the third winding head.

After helix and hoop winding layers are formed, the squeezing fiber winding head 65 winds squeezing fibers around the completed helix and hoop winding layers. The squeezing fibers squeeze out excessive resin from the helix and hoop winding layers. The squeezing fiber winding head 65 is substantially identical to the hoop winding head 6 but does not include the helix fiber spreading portion 30 and the rubbing members 33. Further, the squeezing fiber winding head 65 does not necessarily have to include a fiber spreading portion for the squeezing fibers. However, the squeezing fiber winding head 65 is provided with the second fiber spreading members 43 that spread the corresponding fiber strands R in a manner suitable for the hoop winding. A connecting rod (not shown), which is driven by a cylinder located in the drive plate 12, connects the squeezing fiber winding head 65 to the drive plate 12. This moves the squeezing fiber winding head 65 integrally with the drive plate 12. Synthetic fibers, such as polyester, are used as the squeezing fiber.

The polyester fibers are sent from a fiber feeder to the hole 34a by way of the hoop guides 37, 38 and the second fiber spreading members 43. Portions of the polyester fiber extended through the hole 34a are held by the holders 17a, 17b of the associated one of the end portion processing devices 16. The polyester fibers are held so that they do not interfere with the winding of the helix winding head 5 or the hoop winding head 6.

After the helix and hoop windings are formed in the same manner as in the first embodiment, the squeezing fiber winding head 65 is moved from the position shown in FIG. 20 toward the right with the helix and hoop winding heads 5, 6 located at the home position. The squeezing fiber winding head 65 performs hoop winding so that the squeezing fibers, or the polyester fibers, are wound around the helix and hoop winding layers 61, 62 to cover the entire surface of the outermost layer. The squeezing fibers squeeze out excessive resin from the fiber strands R of the helix winding layers 61 and the hoop winding layers 62 wound around the mandrel M.

In addition to advantages (1) to (12) of the first embodiment, the second embodiment has the following advantages.

(13) The filament winding apparatus 1 of the second embodiment has the squeezing fiber winding head 65. The squeezing fiber winding head 65 winds the squeezing fibers around the helix and hoop winding layers 61, 62, thus squeezing out excessive resin from the fiber strands R of the helix and hoop winding layers 61, 62. This facilitates the fabrication of an FRP pipe that has a high fiber volume content.

(14) The helix winding head 5, the hoop winding head 6, and the squeezing fiber winding head 65 move along the same rail 7. Further, the heads 5, 6, 65 are selectively connected to and disconnected from the single drive plate 12 so that the heads 5, 6, 65 move within a certain range as required. This simplifies the structures of the drive mechanisms that drive the heads 5, 6, 65.

The illustrated embodiments may be modified as follows.

Figure 21:
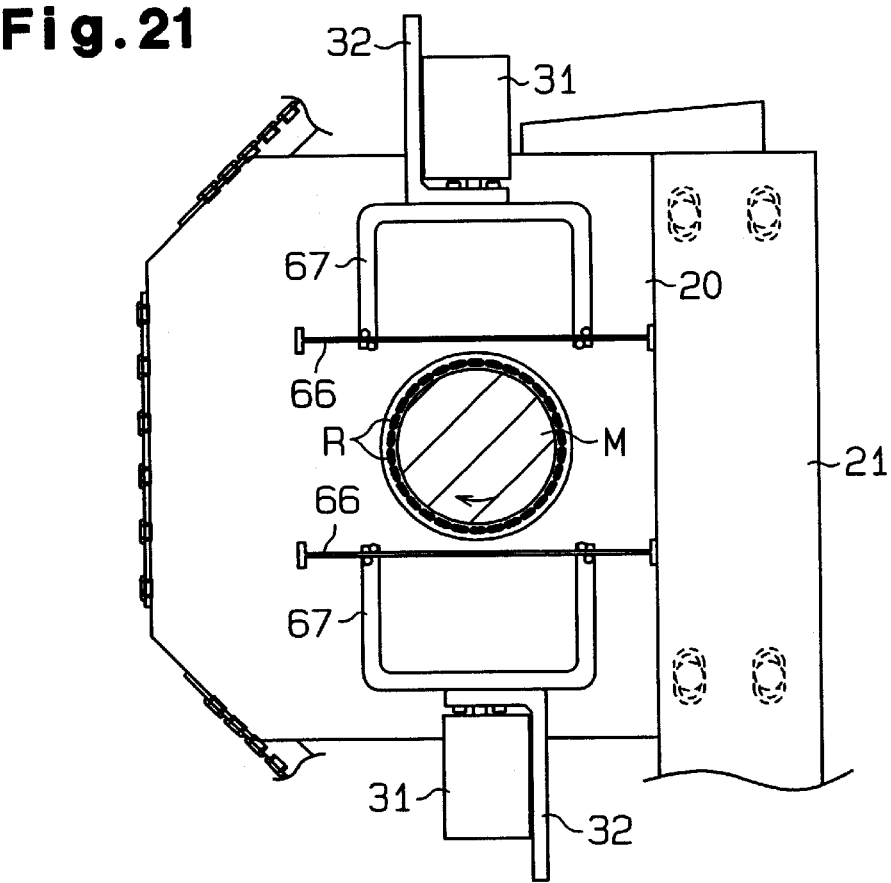
FIG. 21 is a side view schematically showing further types of rubbing members located at standby positions.
Figure 22B:
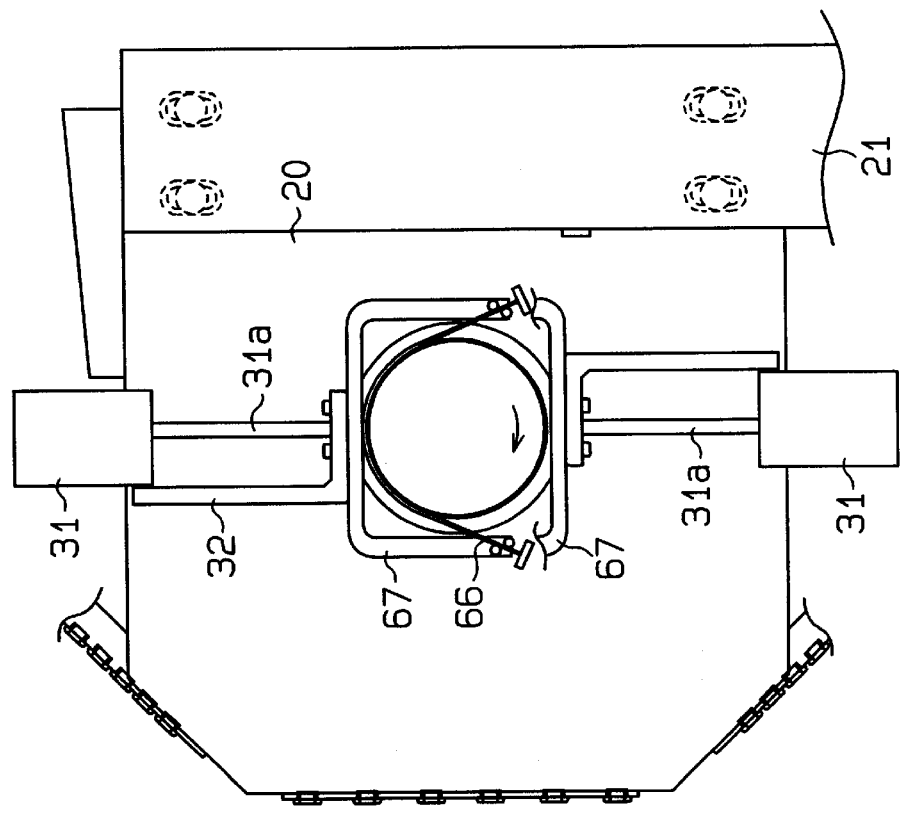
FIG. 22(b) is a right view schematically showing one the rubbing members of FIG. 21 located at a pressing position.
Figure 22A:
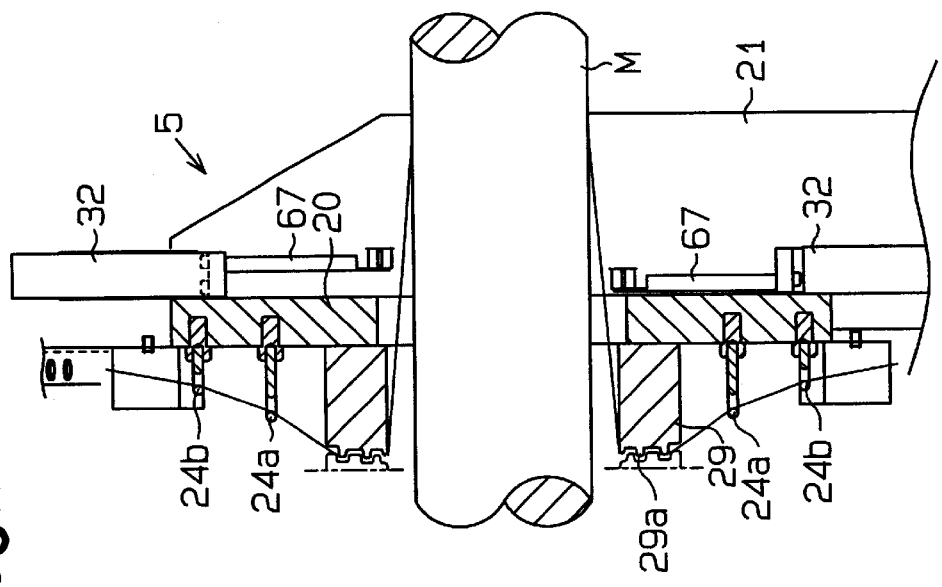
FIG. 22(a) is a schematic cross-sectional view showing the rubbing members of FIG. 21.
Figure 23:
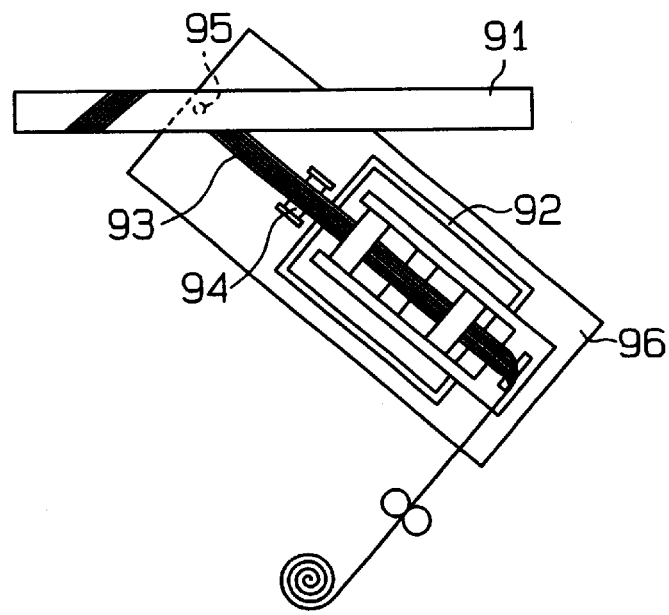
FIG. 23 is a plan view showing a prior art filament winding apparatus.
Figure 24:
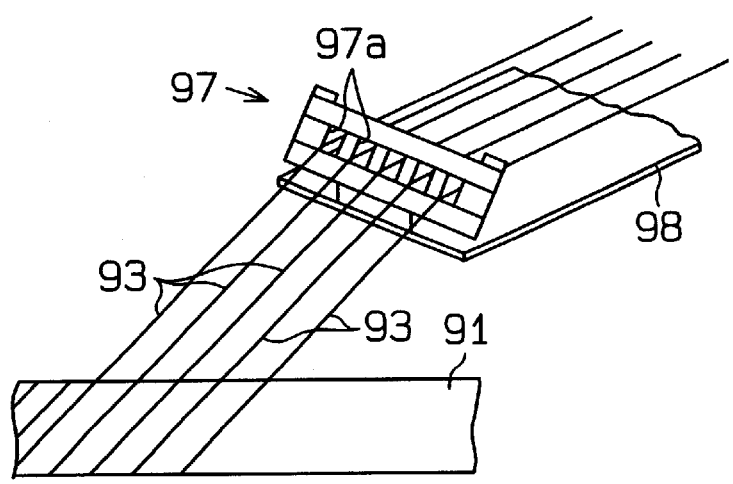
FIG. 24 is a perspective view schematically showing another prior art filament winding apparatus.

Referring to FIGS. 21, 22(a), and 22(b), the rubbing members 33 may be replaced by a pair of opposed U-shaped rubbing members 67. The rubbing members 67 each include an elastic pressing member 66, such as a plate spring, to press the fiber strands R against the mandrel M. Further, the rubbing members 67 are each connected to and driven by an air cylinder 31. Each rubbing member 67 is secured to the associated air cylinder 31 by a bracket 32. When the rubbing members 67 press the associated pressing members 66 against the mandrel M, the pressing members 66 are curved as shown in FIG. 22(b). More specifically, as shown in the state of FIGS. 21 and 22(a), when a piston rod 31a is retracted into the air cylinder 31, the associated pressing member 66 is straight. However, as shown in the state of FIG. 22(b), when the piston rod 31a is projected from the air cylinder 31, the pressing member 66 is curved in correspondence with the fiber strands R wound around the mandrel M. Thus, the pressing member 66 presses the fiber strands R against the mandrel M. If the helix winding head 5 and the hoop winding head 6 are moved while the pressing members 66 are maintained in this state, the rubbing members 67 remove excessive resin from the fiber strands R and defoam the resin of the fiber strands R. The rubbing members 67 have a relatively simple structure.

Alternatively, the angular range of the arcuate surface of each pressing portion 33a in the first embodiment may be increased so that two rubbing members 33 are arranged at opposite positions around the mandrel M. In such case, one of the three rubbing members 33 is not necessary.

A cutaway portion may be formed in the guides 24a, 24b so that the guides 24a, 24b can guide the fiber strands R more easily.

The number of the fiber strands R sent to the helix winding head 5 is not restricted to twenty-eight.

In the filament winding apparatus 1 of the first embodiment, the helix winding head 5 may be driven completely independent from the hoop winding head 6. In this case, the helix fiber spreading portion 30 may be eliminated from the hoop winding head 6. However, the helix fiber spreading portion 30 must be added to the helix winding head 5 in addition to the helix fiber spreading portion 29. An actuator must also be employed to move the helix fiber spreading portion 30 between a position at which the fiber strands R are guided between the helix fiber spreading portions 29, 30 and a position at which the grooves 29a, 30a are engaged with each other. Further, in this case, the rubbing members 33 may be eliminated from the hoop winding head 6.

In the illustrated embodiments, the second fiber spreading member 43 of each hoop fiber spreading portion 41 is pivoted between a horizontal plane and a plane intersecting the horizontal plane. However, each of the second fiber spreading members 43 may be pivoted only along the horizontal plane.

The winding angle of the crossing threads 63 may differ from the winding angle of the fiber strands R when helix winding is performed.

An FRP pipe may include a hoop winding layer 62 formed along the entire surface of a helix winding layer 61.

When the hoop winding layers 62 are formed at the ends of the helix winding layers 61, the fiber strands R may be cut after one of the hoop winding layers 62 is completed. That is, the other hoop winding layer 62 may be formed without using the crossing threads 63.

The cutting of the fiber strands R does not necessarily have to be performed by the rotary cutter 19. Instead, other cutting means, such as a scissor type cutter with a pair of cutting edges, may be used to cut the fiber strands R. If the scissor type is employed, the cutting assisting members 4b may be omitted.

The application of the present invention is not restricted to the manufacturing of the propeller shaft pipe. The present invention may be applied to other types of drive shaft pipes.

Further, the present invention may be applied to a cylindrical container that contains pressurized gas or fluid and has ends covered by dome-like covers. In this case, the fiber strands R are wound around a hollow lining instead of the mandrel M. The lining is either directly held between the rotary shafts 4 and the chucks 2 or indirectly held between the rotary shafts 4 and the chucks 2 by shafts fixed between the ends of the lining and the associated rotary shafts 4. The fiber strands R are then wound around the lining. This structure also enables the fiber strands R to be wound around the lining in an optimally spread state.

When necessary, the carbon fibers, which are used as the fiber strands R, may be replaced by fibers made of other materials, and epoxy resin, with which the fiber strands R are impregnated, may be replaced by other types of resin. However, when manufacturing the propeller shaft, it is preferred that the combination of carbon fibers and epoxy resin be employed to reduce costs and obtain the required properties.

If the winding angle is relatively large, such as when hoop winding is performed, the filament winding apparatus 1 does not necessarily have to have the pins P arranged on the ends of the mandrel M. Further, if the mandrel M has a semispherical portion arranged on each end of the mandrel M, the pins P may be eliminated even if the winding angle is relatively small, such as when performing helix winding, since the fiber strands R may be wound about the semispherical portion when forming the next helix winding layer.

The ball screw mechanism that drives the drive plate 12 may be replaced by, for example, a linear actuator.

In the illustrated embodiments, the hoop winding layers 62 and the crossing threads 63, which connect the hoop winding layers 62, are located between the helix winding layers 61. However, the hoop winding layers 62, which are connected by the crossing threads 63, may be formed as the lowermost layer of the FRP pipe 64. Alternatively, the hoop winding layers 62 may be formed as the outermost layer of the FRP pipe 64. As another option, the hoop winding layers 62 and the helix winding layers 61 may be formed alternately.

The present examples and embodiments are to be considered as illustrative and not restrictive and the invention is not to be limited to the details given herein, but may be modified within the scope and equivalence of the appended claims.

What is claimed is:

1. An FRP pipe comprising:

a helix winding layer formed by cylindrically winding reinforced fibers, wherein the helix winding layer has two ends and an axis, and the reinforced fibers forming the helix winding layer are wound at an angle relative to the axis; and hoop winding layers formed at each end of the helix winding layer by winding reinforced fibers at the ends, wherein the hoop winding layers are formed from the same continuous reinforced fibers, and the continuous reinforced fibers forming the hoop winding layers extend between the ends at an angle that is the same as the angle of the reinforced fibers forming the helix winding layer.

2. The FRP pipe according to claim 1, wherein the helix winding layer is one of a plurality of superimposed layers.

3. An FRP pipe comprising:

a cylindrical wound subject;

a helix winding layer formed by cylindrically winding reinforced fibers around the wound subject, wherein the helix winding layer has two ends and an axis, and the reinforced fibers forming the helix winding layer are wound at an angle relative to the axis; and hoop winding layers formed at each end of the helix winding layer by winding reinforced fibers at the ends, wherein the hoop winding layers are formed from the same continuous reinforced fibers, and the continuous fibers forming the hoop winding layers extend between the ends at an angle that is the same as the angle of the reinforced fibers forming the helix winding layer.

* * * * *

UNITED STATES PATENT AND TRADEMARK OFFICE
CERTIFICATE OF CORRECTION

PATENT NO.   : 6,736,168 B2
DATED        : May 18, 2004
INVENTOR(S)  : Masaaki Amano et al.

It is certified that error appears in the above-identified patent and that said Letters Patent is hereby corrected as shown below:

Title page,
Item [57], ABSTRACT,
Line 7, please delete "hoop layer" and substitute therefore -- hoop winding layers --

Signed and Sealed this

Tenth Day of August, 2004

JON W. DUDAS
*Acting Director of the United States Patent and Trademark Office*